(12) United States Patent
Sato et al.

(10) Patent No.: US 7,248,543 B2
(45) Date of Patent: Jul. 24, 2007

(54) TILT SERVO SYSTEM FOR CORRECTING TILT ANGLE OF LIGHT BEAM IN INFORMATION READ/WRITE APPARATUS

(75) Inventors: Ryo Sato, Saitama-ken (JP); Yoshio Sasaki, Saitama-ken (JP)

(73) Assignee: Pioneer Corporation, Tokyo (JP)

( * ) Notice: Subject to any disclaimer, the term of this patent is extended or adjusted under 35 U.S.C. 154(b) by 625 days.

(21) Appl. No.: 10/624,892

(22) Filed: Jul. 23, 2003

(65) Prior Publication Data

US 2004/0125711 A1 Jul. 1, 2004

(30) Foreign Application Priority Data

Jul. 24, 2002 (JP) .............................. 2002-215600

(51) Int. Cl.
*G11B 7/095* (2006.01)

(52) U.S. Cl. ............................... 369/44.32; 369/53.19; 369/112.02

(58) Field of Classification Search ...................... None
See application file for complete search history.

(56) References Cited

U.S. PATENT DOCUMENTS

| | | | |
|---|---|---|---|
| 4,850,695 A | 7/1989 | Mikuriya et al. |
| 5,627,808 A | 5/1997 | Hajjar et al. |
| 5,886,496 A | 3/1999 | Furukawa et al. |
| 6,115,334 A | 9/2000 | Tsutsui et al. |
| 6,137,754 A | 10/2000 | Furukawa et al. |
| 6,160,772 A | 12/2000 | Muramatsu |
| 6,370,095 B1 * | 4/2002 | Ogasawara ............... 369/53.19 |
| 6,661,415 B1 * | 12/2003 | Yasuda et al. ............... 345/213 |
| 6,754,145 B1 * | 6/2004 | Shimamoto et al. ..... 369/44.32 |

FOREIGN PATENT DOCUMENTS

| | | |
|---|---|---|
| EP | 1 213 711 A2 | 6/2002 |
| JP | 10-177729 | 6/1998 |

OTHER PUBLICATIONS

European Search Report dated Nov. 6, 2003.

\* cited by examiner

*Primary Examiner*—Andrea Wellington
*Assistant Examiner*—Peter Vincent Agustin
(74) *Attorney, Agent, or Firm*—McGinn IP Law Group, PLLC

(57) ABSTRACT

A highly accurate and stable tilt servo system is provided. A liquid crystal device for phase correction is driven based on drive data stored in a lookup memory to thereby make a tilt correction. Upon pre-processing, a pickup is moved to a predetermined position on the inner circumference of a disc for a tilt correction to employ tilt error data delivered from a tilt sensor as reference tilt error data and drive data served for the tilt correction as a reference tilt correction quantity. After the pre-processing, when the pickup is moved, the difference between the tilt error data delivered from the tilt sensor at each position of movement and the reference tilt error data is employed as a relative correction quantity. The drive data equivalent to the relative correction quantity is acquired from the lookup memory. The drive data acquired is added to the reference correction quantity to thereby determine a tilt correction quantity. The liquid crystal device is driven based on drive signals equivalent to the tilt correction quantity.

4 Claims, 14 Drawing Sheets

FIG.3 A

| TILT ANGLE | PRE-MEASURED TILT ERROR DATA | VOLTAGE VALUE DATA OF PRE-MEASURED DRIVE SIGNAL |
|---|---|---|
| $\Delta\theta$ | $Der(\Delta\theta)$ | $V1(\Delta\theta) \sim V5(\Delta\theta)$ |
| $2 \times \Delta\theta$ | $Der(2 \times \Delta\theta)$ | $V1(2 \times \Delta\theta) \sim V5(2 \times \Delta\theta)$ |
| ⋮ | ⋮ | ⋮ |
| $n \times \Delta\theta$ | $Der(n \times \Delta\theta)$ | $V1(n \times \Delta\theta) \sim V5(n \times \Delta\theta)$ |
| $-\Delta\theta$ | $Der(-\Delta\theta)$ | $V1(-1\Delta\theta) \sim V5(-\Delta\theta)$ |
| $-2 \times \Delta\theta$ | $Der(-2 \times \Delta\theta)$ | $V1(-2 \times \Delta\theta) \sim V5(-2 \times \Delta\theta)$ |
| ⋮ | ⋮ | ⋮ |
| $-n \times \Delta\theta$ | $Der(-n \times \Delta\theta)$ | $V1(-n \times \Delta\theta) \sim V5(-n \times \Delta\theta)$ |

FIG.3 B
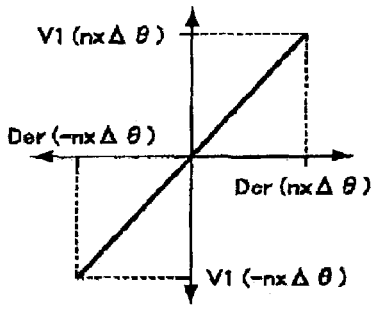

FIG.3 C
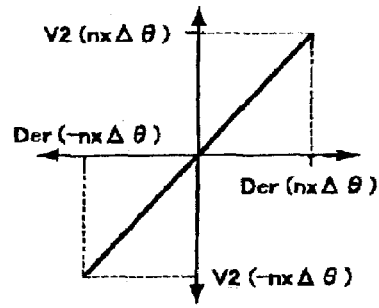

FIG.3 D
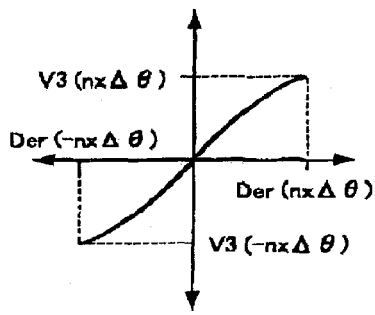

FIG.3 E
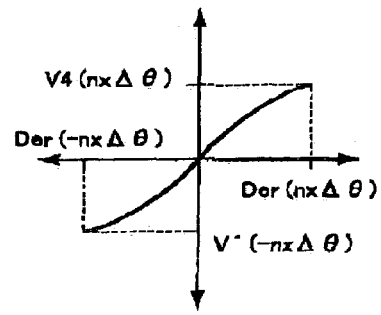

FIG.3 F
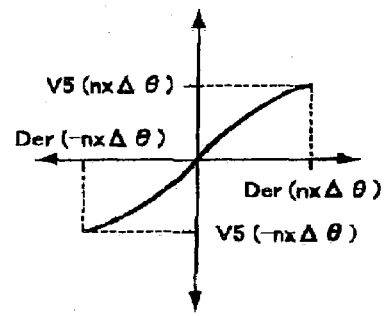

FIG.9

| TILT ANGLE | VOLTAGE VALUE DATA OF PRE-MEASURED DRIVE SIGNAL |
|---|---|
| $\Delta\theta$ | $V1(\Delta\theta) \sim V5(\Delta\theta)$ |
| $2\times\Delta\theta$ | $V1(2\times\Delta\theta) \sim V5(2\times\Delta\theta)$ |
| ⋮ | ⋮ |
| $n\times\Delta\theta$ | $V1(n\times\Delta\theta) \sim V5(n\times\Delta\theta)$ |
| $-\Delta\theta$ | $V1(-1\Delta\theta) \sim V5(-\Delta\theta)$ |
| $-2\times\Delta\theta$ | $V1(-2\times\Delta\theta) \sim V5(-2\times\Delta\theta)$ |
| ⋮ | ⋮ |
| $-n\times\Delta\theta$ | $V1(-n\times\Delta\theta) \sim V5(-n\times\Delta\theta)$ |

TILT SERVO SYSTEM FOR CORRECTING TILT ANGLE OF LIGHT BEAM IN INFORMATION READ/WRITE APPARATUS

BACKGROUND OF THE INVENTION

The present invention relates to a tilt servo system incorporated, for example, into an information read/write apparatus or the like.

The present application claims priority from Japanese Application No. 2002-215600, the disclosure of which is incorporated herein by reference.

Conventionally, an information read/write apparatus for writing or reading information on or from an information storage medium such as CDs (Compact Disc) or DVDs (Digital Versatile Disc) (hereinafter referred to as a "disc") is provided with a tilt servo system to prevent an angle deviation (hereinafter referred to as a "tilt angle") from occurring between the direction of emission of a light beam emitted from an objective lens incorporated into a pickup and the direction of the normal to the recording surface of a disc being illuminated with the light beam.

A prior art tilt servo system is provided at a predetermined position near an objective lens with a tilt sensor for optically detecting the angle of inclination of a disc to control the orientation of the objective lens in accordance with a sensor output from the tilt sensor, thereby preventing the occurrence of a tilt error.

The prior art tilt servo system has the property that its servo accuracy depends on various factors such as the accuracy with which the objective lens, the tilt sensor, and other associated components are attached as well as the characteristics of the tilt sensor and electronic devices for providing tilt servo control.

For these reasons, for example, upon assembling the pickup, the objective lens, the tilt sensor, and other components are assembled while the direction of the optical axis of the objective lens, the detecting direction of the tilt sensor and the like are set, in accordance with the specifications and conditions which are prescribed to realize tilt servo control with high accuracy.

However, for example, since there exist variations such as in fabrication accuracy of the objective lens, the tilt sensor, and other components, resulting in some cases in unallowable accuracy error even when the pickup is assembled in accordance with the aforementioned specifications and conditions, a final fine adjustment is made after the assembly process and before the shipment of the product.

However, since the final fine adjustment may affect other portions leading to another problem, a comprehensive and precise work for making the final fine adjustment was required to realize highly accurate tilt servo control, thereby, for example, causing the adjustment to be complicated and insufficient making it impossible to improve yields.

More specifically, by way of example, the following problems are included in the case mentioned above. To satisfy the design specifications of the prior art tilt servo system, at the designing stage before the assembly process described above, individual parts constituting the tilt servo are designed, and standard correction quantity data is prepared for appropriately making a tilt correction to the orientation of the objective lens in accordance with the sensor output of the tilt sensor.

Then, the relationship between the tilt angle θ at which a standard adjustment disc is inclined relative to the tilt sensor and the variation in the sensor output V delivered by the tilt sensor is empirically measured in advance. Then, a lookup table containing standard correction quantity data as shown by the resulting characteristic curve (1) illustrated in FIG. 14 is prepared in advance in a ROM (Read-Only memory) or the like, which is then incorporated into the tilt servo system in the assembly process.

Accordingly, when a user loads his or her desired disc into the information read/write apparatus after the shipment of the product, e.g., to write information thereon, the tilt servo system retrieves the correction quantity data for a tilt angle θs corresponding, e.g., to a sensor output Vs from the lookup table to make a tilt correction in accordance with the correction quantity data.

Although the aforementioned correction quantity data satisfies the design specifications, a fine adjustment may be further made after the aforementioned assembly process before the shipment of the product, in the case of which such a problem may be raised that the pre-standardized and fixed correction quantity data would not satisfy the condition for providing tilt servo control with high accuracy.

For example, suppose that as a result of the aforementioned fine adjustment, a tilt correction is made in accordance with the aforementioned characteristic curve (1) even though the relationship between the tilt angle θ of the objective lens and the sensor output V of the tilt sensor varies as shown by the characteristic curve (2) illustrated in FIG. 14. In this case, since a tilt angle θe that should be actually corrected cannot be determined when the sensor output V from the tilt sensor is Vs, the orientation of the objective lens would be adjusted in accordance with the correction quantity data on an erroneous tilt angle θs, thereby degrading the accuracy of the tilt correction.

For these reasons, a comprehensive and precise work for making the final fine adjustment was required to realize highly accurate tilt servo control, thereby, for example, causing the adjustment to be complicated and insufficient making it impossible to improve yields in some cases.

SUMMARY OF THE INVENTION

The present invention was developed in view of the aforementioned problems with the prior art tilt servo system or the like. It is therefore an object of the present invention to provide a tilt servo system which provides high reliability and effects such as a so-called maintenance-free effect.

The tilt servo system according to a first aspect of the present invention includes sensor means for detecting a tilt angle of a light beam emitted from a pickup to an information storage medium, correction means for correcting a tilt angle of a light beam relative to the information storage medium, and control means for allowing the correction means to correct the tilt angle of the light beam in accordance with a sensor output of the sensor means. The tilt servo system is designed such that the control means employs, as a reference tilt error, a sensor output delivered from the sensor means when the pickup is located opposite to a predetermined position of the information storage medium and as a reference tilt correction quantity, a tilt correction quantity set in order to allow the correction means to correct the tilt angle of the light beam in response to the reference tilt error, and when the pickup is located opposite to a position other than the predetermined position of the information storage medium, the control means employs a difference between a sensor output delivered by the sensor means and the reference tilt error as a relative correction quantity and controls the correction means in accordance with a tilt correction quantity obtained by adjusting the reference correction quantity according to the relative correction quantity to thereby correct the tilt angle of the light beam.

The tilt servo system according to a second aspect of the present invention is designed to correct a tilt angle between an objective lens incorporated into a pickup and an information storage medium. The tilt servo system includes a phase correction device for adjusting a phase thereof relative to a light beam incident from a light source and allowing the information storage medium to be illuminated with the light beam via the objective lens, storage means for storing drive data for driving the phase correction device to adjust the phase, the drive data being associated with each of a plurality of pre-estimated tilt angles, a tilt sensor for detecting a tilt error of the objective lens relative to the information storage medium, and control means for producing a tilt correction quantity by correcting the drive data stored in the storage means in accordance with the tilt error detected by the tilt sensor to drive the phase correction device according to the tilt correction quantity. The tilt servo system is designed such that the control means performs pre-processing to make a tilt correction by moving the pickup to a predetermined area side of the information storage medium and by adjusting a phase of the phase correction device in accordance with the drive data stored in the storage means, and to employ a tilt error detected by the tilt sensor upon the tilt correction as reference tilt error data and the drive data serving for the tilt correction as a reference tilt correction quantity, and after the pre-processing, the control means produces the tilt correction quantity by acquiring from the storage means the drive data corresponding to a relative correction quantity equivalent to a difference between a tilt error detected by the tilt sensor as the pickup moves and the reference tilt error data and adding the drive data to the reference correction quantity.

The tilt servo system according to a third aspect of the invention is designed to correct a tilt angle between an objective lens incorporated into a pickup and an information storage medium. The tilt servo system includes an actuator for adjusting an angle of the objective lens relative to the information storage medium, storage means for storing drive data for driving the actuator to adjust the angle of the objective lens, the drive data being associated with each of a plurality of pre-estimated tilt angles, a tilt sensor for detecting a tilt error of the objective lens relative to the information storage medium, and control means for producing a tilt correction quantity by correcting the drive data stored in the storage means in accordance with the tilt error detected by the tilt sensor to drive the actuator according to the tilt correction quantity. The tilt servo system is designed such that the control means performs pre-processing to make a tilt correction by moving the pickup to a predetermined area side of the information storage medium and by driving the actuator in accordance with the drive data stored in the storage means, and to employ a tilt error detected by the tilt sensor upon the tilt correction as reference tilt error data and the drive data serving for the tilt correction as a reference tilt correction quantity, and after the pre-processing, the control means produces the tilt correction quantity by acquiring from the storage means the drive data corresponding to a relative correction quantity equivalent to a difference between a tilt error detected by the tilt sensor as the pickup moves and the reference tilt error data and adding the drive data to the reference correction quantity.

The tilt servo system according to a fourth aspect of the invention is designed to correct a tilt angle between an objective lens incorporated into a pickup and an information storage medium. The tilt servo system includes a phase correction device for adjusting a phase thereof relative to a light beam incident from a light source and allowing the information storage medium to be illuminated with the light beam via the objective lens, storage means for storing drive data for driving the phase correction device to adjust the phase, the drive data being associated with each of a plurality of pre-estimated tilt angles, focus servo means for focusing the objective lens on the information storage medium, and control means for producing a tilt correction quantity equivalent to a tilt angle in accordance with a separation between the information storage medium and the objective lens, when focused by the focus servo means, to drive the phase correction device according to the drive data in the storage means corresponding to the tilt correction quantity. The tilt servo system is designed such that the control means performs pre-processing: for moving the pickup to a reference position on a predetermined area side of the information storage medium to determine, as reference separation value data, a separation between the objective lens focused by the focus servo means and the information storage medium; for further moving the pickup from the reference position at appropriate intervals to determine, as separation value data, a separation between the objective lens focused by the focus servo means and the information storage medium at each position of movement at each interval of movement; for determining an angle of inclination at each position of movement from a ratio of a difference between separation value data at the mutually adjacent positions of movement to an interval of movement there between and also for determining a reference angle of inclination from a ratio of a difference between the reference separation value data at the reference position and separation value data at a position of movement adjacent thereto to an interval of movement there between; and for further employing a difference between an angle of inclination and a reference angle of inclination at each position of movement as a relative correction quantity and the drive data in the storage means corresponding to the reference angle of inclination as a reference tilt correction quantity, and after the pre-processing, the control means determines the tilt correction quantity, as the pickup moves, by adding the drive data in the storage means corresponding to a relative correction quantity at each of the positions of movement to the reference correction quantity.

The tilt servo system according to a fifth aspect of the invention is designed to correct a tilt angle between an objective lens incorporated into a pickup and an information storage medium. The tilt servo system comprises an actuator for adjusting an angle of the objective lens relative to the information storage medium, storage means for storing drive data for driving the actuator to adjust the angle of the objective lens, the drive data being associated with each of a plurality of pre-estimated tilt angles, focus servo means for focusing the objective lens on the information storage medium, and control means for producing a tilt correction quantity equivalent to a tilt angle in accordance with a separation between the information storage medium and the objective lens, when focused by the focus servo means, to drive the actuator according to the drive data in the storage means corresponding to the tilt correction quantity. The tilt servo system is adapted such that the control means performs pre-processing: for moving the pickup to a reference position on a predetermined area side of the information storage medium to determine, as reference separation value data, a separation between the objective lens focused by the focus servo means and the information storage medium; for further moving the pickup from the reference position at appropriate intervals to determine, as separation value data, a separation between the objective lens focused by the focus servo means and the information storage medium at each position of movement at each interval of movement; for determining an angle of inclination at each position of movement from a ratio of a difference between separation value data at the mutually adjacent positions of movement to an interval of movement there between and also for determining a reference angle of inclination from a ratio of a difference between the reference separation value data at the reference position and separation value data at a position of movement adjacent thereto to an interval of movement there between; and for further employing a difference between an angle of inclination and a reference angle of inclination at each position of movement as a relative correction quantity and the drive data in the storage means corresponding to the reference angle of inclination as a reference tilt correction quantity, and after the pre-processing, the control means determines the tilt correction quantity, as the pickup moves, by adding the drive data in the storage means corresponding to a relative correction quantity at each of the positions of movement to the reference correction quantity.

According to the tilt servo system set forth in the first aspect, the sensor output delivered from the sensor means is employed as a reference tilt error when the pickup and an information storage medium are located opposite to each other at a predetermined position, while a tilt correction quantity set to allow the correction means to correct the tilt angle of a light beam in response to the reference tilt error is employed as the reference correction quantity.

When the pickup is located opposite to other than a predetermined position on the information storage medium, the difference between the sensor output delivered from the sensor means and the reference tilt error is employed as a relative correction quantity. The correction means is controlled in accordance with a tilt correction quantity obtained by adjusting the reference correction quantity according to the relative correction quantity, thereby making a tilt correction to the tilt angle of the light beam.

According to the tilt servo system set forth in the second aspect, the phase correction device is driven according to the drive data stored in the storage means to adjust the phase of the phase correction device relative to the incident light beam, thereby making a tilt correction.

Furthermore, upon the pre-processing, the pickup is moved to a predetermined area side on the information storage medium to adjust the phase of the phase correction device in accordance with the drive data stored in the storage means, thereby making a tilt correction. Upon the tilt correction, the tilt error detected by the tilt sensor is then employed as the reference tilt error data while the drive data serving for the tilt correction is employed as the reference correction quantity.

After the pre-processing, when the pickup is moved, the control means produces the tilt correction quantity by acquiring from the storage means the drive data corresponding to the relative correction quantity equivalent to the difference between the tilt error detected by the tilt sensor as the pickup moves and the reference tilt error data to add the drive data to the reference correction quantity. Then, the phase correction device is driven according to the drive data equivalent to the tilt correction quantity to adjust the phase of the phase correction device relative to the incident light beam, thereby making an appropriate tilt correction.

According to the tilt servo system set forth in the third aspect, the actuator is driven according to the drive data stored in the storage means, thereby making a tilt correction to the angle of the objective lens.

Furthermore, upon the pre-processing, the pickup is moved to a predetermined area side on the information storage medium to drive the actuator in accordance with the drive data stored in the storage means, thereby making a tilt correction. Upon the tilt correction, the tilt error detected by the tilt sensor is then employed as the reference tilt error data while the drive data serving for the tilt correction is employed as the reference correction quantity.

After the pre-processing, when the pickup is moved, the control means acquires from the storage means the drive data corresponding to the relative correction quantity equivalent to the difference between the tilt error detected by the tilt sensor as the pickup moves and the reference tilt error data. Then, the drive data is added to the reference correction quantity to produce the tilt correction quantity, and the actuator is driven according to the drive data equivalent to the tilt correction quantity to adjust the angle of the objective lens, thereby making an appropriate tilt correction.

According to the tilt servo system set forth in the fourth aspect, the phase correction device is driven according to the drive data stored in the storage means to adjust the phase of the phase correction device relative to the incident light beam, thereby making a tilt correction.

Furthermore, upon the pre-processing, the pickup is moved to a predetermined area side on the information storage medium to determine a separation between the objective lens in focus and the information storage medium as reference separation value data. The pickup is further moved from the reference position at appropriate intervals to determine, as separation value data, the separation between the objective lens in focus and the information storage medium at each position of movement at each interval of movement. Furthermore, an angle of inclination at each position of movement is determined from a ratio of a difference between separation value data at mutually adjacent positions of movement to an interval of movement therebetween and a reference angle of inclination is determined from a ratio of a difference between the reference separation value data at the reference position and separation value data at a position of movement adjacent thereto to an interval of movement therebetween, respectively. Furthermore, a difference between an angle of inclination and a reference angle of inclination at each position of movement is employed as a relative correction quantity and drive data in the storage means corresponding to the reference angle of inclination is employed as a reference tilt correction quantity.

After the pre-processing, when the pickup is moved, the control means determines, as the pickup moves, the tilt correction quantity by adding the drive data in the storage means corresponding to the relative correction quantity at each position of movement to the reference correction quantity. Then, the phase correction device is driven according to the tilt correction quantity to adjust the phase of the phase correction device relative to the incident light beam, thereby making an appropriate tilt correction.

According to the tilt servo system set forth in the fifth aspect, the actuator is driven according to the drive data stored in the storage means, thereby making a tilt correction to the angle of the objective lens.

Furthermore, upon the pre-processing, the pickup is moved to a predetermined area side on the information storage medium to determine a separation between the objective lens in focus and the information storage medium as reference separation value data. The pickup is further moved from the reference position at appropriate intervals to determine, as separation value data, the separation between the objective lens in focus and the information storage medium at each position of movement at each interval of movement. Furthermore, an angle of inclination at each position of movement is determined from a ratio of a difference between separation value data at mutually adjacent positions of movement to an interval of movement therebetween, while a reference angle of inclination is determined from a ratio of a difference between the reference separation value data at the reference position and separation value data at a position of movement adjacent thereto to an interval of movement therebetween. Furthermore, a difference between an angle of inclination and a reference angle of inclination at each position of movement is employed as a relative correction quantity and drive data in the storage means corresponding to the reference angle of inclination is employed as a reference tilt correction quantity.

After the pre-processing, when the pickup is moved, the control means determines, as the pickup moves, the tilt correction quantity by adding the drive data in the storage means corresponding to the relative correction quantity at each position of movement to the reference correction quantity. Then, the actuator is driven in accordance with the tilt correction quantity, thereby making an appropriate tilt correction to the angle of the objective lens.

BRIEF DESCRIPTION OF THE DRAWINGS

These and other objects and advantages of the present invention will become clear from the following description with reference to the accompanying drawings, wherein:

FIGS. 3A to 3F are views illustrating the structure or the like of a lookup table to be stored in a lookup memory;

FIG. 9 is a view illustrating the Structure of a lookup table in a lookup memory provided in the tilt servo system according to the second embodiment;

DETAILED DESCRIPTION OF THE PREFERRED EMBODIMENTS

Now, the present invention will be described below with reference to the accompanying drawings in accordance with the embodiments.

For convenience in description, information storage media such as CDs or DVDs are generally referred to simply as a "disc." Some of the disc media on which information can be recorded, such as a CD-R, CD-RW, DVD-R, or DVD-RW, are called an "information write disc" while those discs on which information has already been recorded and cannot be written any more are called an "information read disc."

First Embodiment

Now, a first embodiment will be described with reference to FIGS. 1 to 5.

Figure 1:
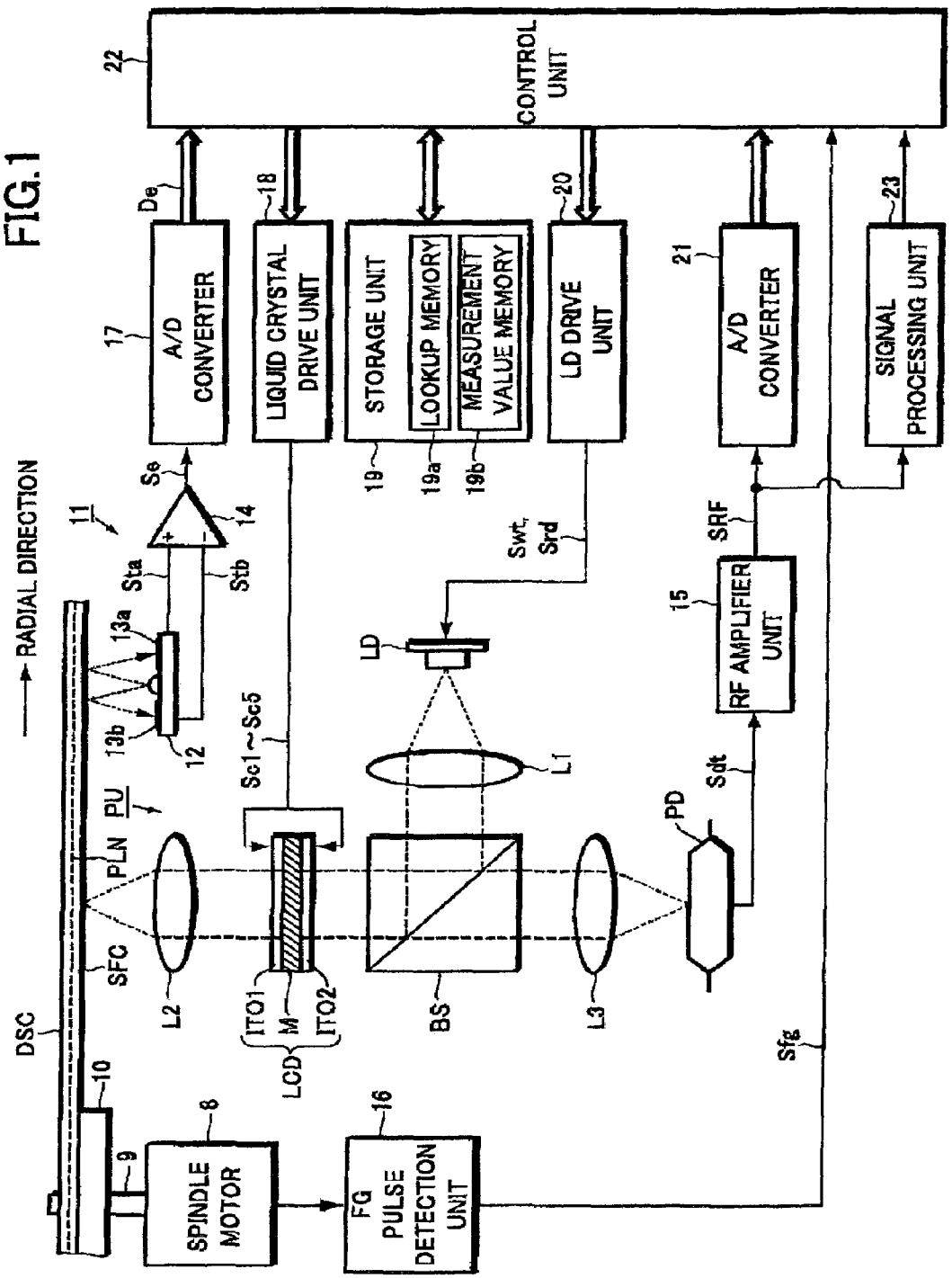
FIG. 1 is a block diagram illustrating the configuration of a tilt servo system according to a first embodiment.

FIG. 1 is a block diagram illustrating the configuration of a tilt servo system incorporated into an information read/write apparatus according to this embodiment.

In the figure, this information read/write apparatus comprises a spindle motor 8 and a turntable 10 provided on a rotating shaft 9 of the spindle motor 8.

A pickup PU comprises a semiconductor laser LD for emitting a coherent laser beam, a collimator lens L1, an objective lens L2, a converging lens L3, a half mirror BS, a liquid crystal device LCD serving as phase correction means, a light-receiving device PD, a tilt sensor 11, and an RF amplifier unit 15.

Although not illustrated, the pickup PU is slidably provided in its entirety on a shaft of a so-called slider mechanism and designed to be driven by a carriage motor to move back and forth in the radial direction of a disc DSC.

Furthermore, this information read/write apparatus comprises a FG pulse detection unit 16, an A/D converter 17, a liquid crystal drive unit 18 for driving the liquid crystal device LCD, a storage unit 19, an LD drive unit 20 for driving the semiconductor laser LD, an A/D converter 21, a control unit 22, and a signal processing unit 23.

On the other hand, the tilt servo system according to this embodiment mainly consists of the liquid crystal device LCD, the tilt sensor 11, the A/D converter 17, the liquid crystal drive unit 18, the storage unit 15, the LD drive unit 20, the A/D converter 21, and the control unit 22, in which the control unit 22 made up of a microprocessor (MPU) or a digital signal processor (DSP), having computational and control functions, executes a pre-set system program to thereby intensively manage the control of tilt correction.

Upon reading information, the semiconductor laser LD emits laser light (hereinafter referred to as a "read beam") at a constant power level for reading information when an information read signal Srd is supplied from the LD drive unit 20 under the control of the control unit 22.

On the other hand, upon writing information, when an information write signal Swt containing predetermined encoded text data, control data, image data, audio data or the like is supplied from the LD drive unit 20 under the control of the control unit 22, the semiconductor laser LD emits laser light modulated by the information write signal Swt to write information, (the laser light being hereinafter referred to as a "write beam").

Upon reading information as described above, the read beam emitted from the semiconductor laser LD at a constant power level is collimated by the collimator lens L1 to be incident upon the half mirror BS, on which the read beam is reflected to pass through the liquid crystal device LCD to be then incident upon the objective lens L2.

Subsequently, the read beam incident upon the objective lens L2 is converged to a fine spot-shaped light beam and then incident upon a recording surface PLN of an information read disc DSC, thereby reading information recorded on the recording surface PLN.

That is, a light beam of the read beam incident upon the recording surface PLN of the information read disc DSC is modulated by marks (conventionally also called "pits") formed on the recording surface PLN into reflected light (hereinafter referred to as "return light"), thereby making it possible to read information.

Then, the return light sequentially passes through the objective lens L2, the liquid crystal device LCD, the half mirror BS, and the converging lens L3, and is then incident upon the light-receiving surface of the light-receiving device PD.

When the return light has impinged upon the light-receiving device PD, the light-receiving device PD converts the return light optoelectronically to thereby deliver an optoelectronically converted signal Sdt, while, for example, the RF amplifier unit 15 amplifies the optoelectronically converted signal Sdt to thereby deliver an RF signal SRF having information such as on the aforementioned marks.

The signal processing unit 23 performs the demodulation processing specified for each type of information read disc DSC on the RF signal SRF, thereby reproducing, for example, the text data, management data, image data, or audio data, which is recorded on the recording surface PLN.

Upon writing information as described above, the write beam emitted from the semiconductor laser LD is collimated by the collimator lens L1 to be incident upon the half mirror BS, on which the write beam is reflected to pass through the liquid crystal device LCD to be then incident upon the objective lens L2.

Subsequently, the write beam incident upon the objective lens L2 is converged to a fine spot-shaped light beam and then incident upon a recording surface PLN of an information write disc DSC, thereby forming marks on the recording surface PLN as the write information equivalent to the information write signal Swt described above.

Upon recording information on the information write disc DSC, the processing similar to the aforementioned information read processing is first performed under the control of the control unit 22 to thereby read and reproduce control data or the like, which has already been recorded on the lead-in area of the Information write disc DSC, and then start writing information; the detail of which will be further described later in conjunction with the description of the operation.

The liquid crystal device LCD comprises transparent electrode layers ITO1 and ITO2 disposed oppositely in the direction in which the write beam is transmitted (along the optical axis of the pickup optical system) and a liquid crystal layer M buried in between those transparent electrode layers ITO1 and ITO2.

As shown in the plan view illustrated in FIG. 2A, the transparent electrode layer ITO1 is formed of generally elliptical patterns P1 and P2, a generally annular pattern P3 surrounding the patterns P1 and P2, and generally arc-shaped patterns P4 and P5 which are provided on the outer circumferential side of the pattern P3. These patterns P1 to P5 are disposed symmetrically about the radial direction of the disc DSC (the X1—X1 direction in the figure). On the other hand, the transparent electrode layer ITO2 is formed as a so-called common electrode.

Furthermore, drive signals Sc1, Sc2, Sc3, Sc4, and Sc5 from the liquid crystal drive unit 18 are applied to between the patterns P1, P2, P3, P4, and P5 and the transparent electrode layer ITO2.

Variations in the drive signals Sc1, Sc2, Sc3, Sc4, and Sc5 would cause a variation in the alignment of each portion in the, liquid crystal layer M corresponding to the patterns P1, P2, P3, P4, and P5 to produce a time delay distribution causing a delay in transmission of light (in other words, a distribution of phase differences) in the liquid crystal layer M, as shown in FIG. 2B.

Then, the wavefront of the write beam incident from the half mirror BS side upon writing information is phase adjusted according to the distribution of delay times and then the phase adjusted write beam is converged by the objective lens L2 to a spot-shaped light beam capable of making a tilt correction, which is in turn allowed to impinge upon the recording surface PLN of the information write disc DSC.

That is, assume that without the liquid crystal device LCD provided, a light beam that has not been phase adjusted as described above is incident diagonally upon the recording surface PLN of the information write disc DSC. In this case, for example, coma may occur in the light beam when the light beam passes through a light incident layer SFC formed on a surface portion of the information write disc DSC and thereby make it impossible to form proper marks on the recording surface PLN, thus making it extremely difficult to write information with high quality.

In contrast to this, this embodiment provides the light beam in advance with an aberration opposite to the coma occurring in the light incident layer SFC and then permits the light beam to impinge upon the information write disc DSC in accordance with the time delay distribution in the liquid crystal layer M that has been adjusted in response to the drive signals Sc1, Sc2, Sc3, Sc4, and Sc5, thereby allowing the coma occurring in the light incident layer SFC and the pre-provided opposite aberration to cancel each other out for tilt correction.

Accordingly, without adjusting the orientation of the objective lens L2, it is possible to make a tilt correction.

Then, the control unit 22 makes a tilt correction by instructing the liquid crystal drive unit 18 to output the drive signals Sc1, Sc2, Sc3, Sc4, and Sc5 at appropriate voltages in response to a tilt error signal Se delivered from the tilt sensor 11, described later, (more specifically, in response to tilt error data De delivered from the A/D converter 17).

The tilt sensor 11 is provided at an end of the pickup PU near the objective lens L2. The tilt sensor 11 comprises a light source 12, such as a light emitting diode, for emitting light toward the recording surface PLN of the information write disc DSC, at least two light-receiving devices 13a and 13b separately disposed near the light source 12, and a differential amplifier 14.

The light source 12 and the light-receiving devices 13a and 13b are arranged in the radial direction of the disc DSC.

Upon writing information, the tilt sensor 11 allows the light source 12 to emit light toward the information write disc DSC and the light-receiving devices 13a and 13b to receive the light reflected off the information write disc DSC (hereinafter referred to as the "tilt error detection light") thereby delivering detection signals Sta and Stb indicative of the amount of light received at the respective devices.

Furthermore, the differential amplifier 14 determines the difference in the level of the detection signals Sta and Stb, thereby delivering the tilt error signal Se indicative of the angle of inclination of the disc DSC.

That is, since the light emitted from the light source 12 toward the information write disc DSC is reflected as the tilt error detection light in the direction responsive to the angle of inclination of the disc DSC, the positions of incidence of the tilt error detection light upon the light-receiving devices 13a and 13b will be displaced in response to the angle of inclination of the disc DSC.

This causes each of the light-receiving devices 13a and 13b to receive the tilt error detection light at a division ratio responsive to the angle of inclination of the information write disc DSC. Furthermore, the differential amplifier 14 determines the difference between the detection signals Sta and Stb delivered from each of the light-receiving devices 13a and 13b, thereby making it possible to produce the tilt error signal Se indicative of various angles of inclination of the information write disc DSC.

The A/D converter 17 converts the tilt error signal Se from analog to digital to produce the tilt error data De, which is in turn supplied to the control unit 22.

The FG pulse detection unit 16 detects variations in the drive current for rotating the rotating shaft 9 of the spindle motor 8 to thereby detect the angular velocity of the disc DSC, and then supplies the resulting detection signal Sfg one by one to the control unit 22.

The storage unit 19 comprises a lookup memory 19a formed of a read-only memory (ROM), and a measurement value memory 19b formed of a rewritable memory (RAM).

As shown by way of example in FIG. 3A, data V1 to V5 indicative of each voltage value of the drive signals Sc1 to Sc5 (hereinafter referred to as the "voltage value data") and tilt error data Der is pre-stored in the lookup memory 19a as a lookup table associated with the tilt angle $\theta$.

That is, in an experiment process or the like before the shipment of the product, a standard disc which has no distortion or the like and is compliant with specifications is loaded and successively inclined at predetermined fine angular intervals of $\pm\Delta\theta$ so as to produce various tilt angles $\theta$. At the respective tilt angles $\pm\Delta\theta$, $\pm 2\times\Delta\theta$, $\pm 3\times\Delta\theta$, ..., and $\pm n\times\Delta\theta$, empirically measured is the tilt error data Der detected by the tilt sensor 11 and delivered from the A/D converter 17 and the voltage value data V1 to V5 indicative of each voltage value of the drive signals Sc1 to Sc5 that allows the liquid crystal device LCD to produce a time delay distribution capable of making tilt corrections.

Then, the tilt error data Der and each of the voltage value data V1 to V5 is associated with each other in accordance with the respective tilt angles $\pm\Delta\theta$, $\pm 2\times\Delta\theta$, $\pm 3\times\Delta\theta$, ..., and $\pm n\times\Delta\theta$, thereby preparing a lookup table, which is then pre-stored in the lookup memory 19a.

The lookup table is stored in advance in the lookup memory 19a as described above, thereby making it possible to retrieve the voltage value data V1 to V5 for tilt correction corresponding to the tilt error data Der, as shown by the characteristic curves illustrated in FIGS. 3B to 3F.

The measurement value memory 19b is provided as a work area, e.g. for computing the optimum voltage values of the drive signals Sc1 to Sc5 so that the control unit 22 makes a tilt correction.

Now, the operation of the tilt servo system configured as described above is described in detail with reference to the flowcharts illustrated in FIGS. 4 and 5.

Although this information read/write apparatus has both the functions for reading and writing information, the following descriptions are directed mainly to the operation of the tilt servo system for writing information.

Figure 4:
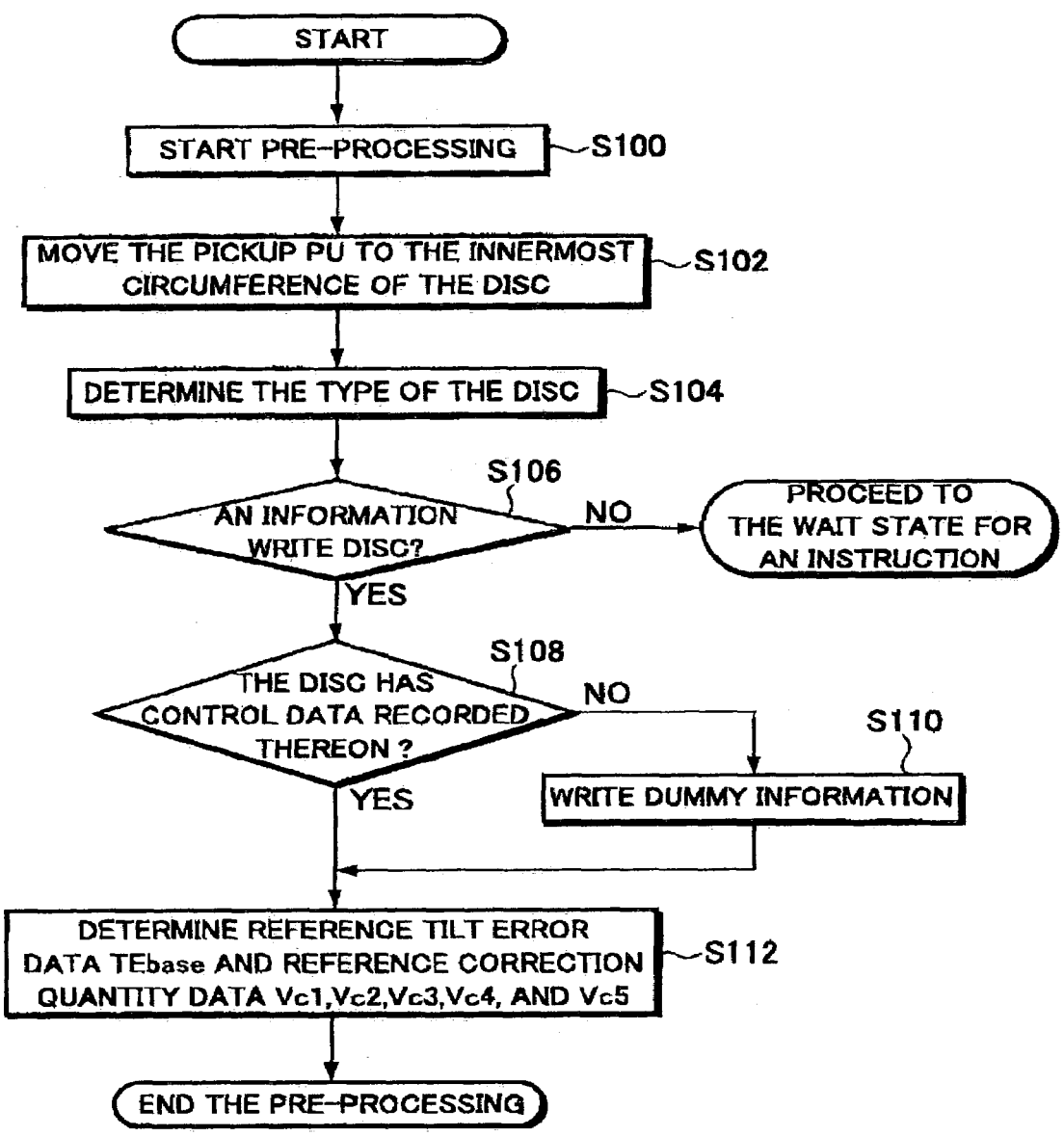
FIG. 4 is an explanatory flowchart illustrating the operation of a tilt servo system in a pre-processing step.

Referring to FIG. 4, when a user loads his desired disc DSC onto the turntable 10, the processing for writing information is started automatically or in accordance with a user's instruction.

First, in step S100, the pre-processing for making a predetermined preparation is started under the control of the control unit 22.

In step S102, when the pre-processing is started, the disc DSC is rotated, while the pickup PU is moved as close to the turntable 10 side as possible, and the start point of movement of the pickup PU is preset.

Then, in step S104, the pickup PU is moved to the lead-in area defined in the specifications for CDs or DVDs or a predetermined area in which management data such as so-called TOC information or video management information is pre-stored, and the semiconductor laser LD is allowed to emit the read beam to reproduce the management data, thereby determining the type of the disc DSC loaded.

Then, in step S106, the process determines in accordance with the aforementioned judgment whether an information write disc has been loaded on which information can be written.

Suppose that an information read disc dedicated only to information reading or an information write disc with information having been already written thereon has been loaded. In this case, the control unit 22 determines that information cannot be written thereon ("NO" in the flowchart), and then provides an indication for the determination on a display unit (not shown) and temporarily stops the information write operation, being then placed in the wait state for an instruction by the user.

However, suppose that such an information read disc has been loaded onto which information cannot be written. In this case, this information read/write apparatus may be designed to automatically change from an information write mode to an information read mode to start reproducing information on the information read disc loaded.

This information read/write apparatus may also be adapted to forcefully unload the information read disc loaded while providing an indication saying that the disc should be replaced with an information write disc, being then placed in the wait state for an instruction by the user.

In step S106 described above, if the process has determined that an information write disc DSC has been loaded (in the case of "YES"), the process proceeds to step S108 to determine whether pre-stored is the data for controlling the pre-write portion or the readable emboss portion or the like which are used to control the writing of information on the aforementioned lead-in area.

That is, such a determination is made because depending on the type of the information write disc, there exist such discs that have the aforementioned control data not written thereon with so-called contents data having not been recorded in a data storage area (also referred to as a program area) and that have the control data written thereon even with the contents data having not been recorded therein.

When having determined that an information write disc DSC having the control data written thereon has been loaded, the process proceeds to step S112, whereas when having determined that an information write disc DSC having the control data not written thereon has been loaded, the process performs the write processing of step S110 and then proceeds to step S112.

In step S110 described above, the process allows the semiconductor laser LD to emit the write beam in order to write a certain amount of predetermined dummy information on the calibration area within the lead-in area which is not originally used for writing information.

That is, dummy information marks are formed as tentative control data in the calibration area of the information write disc DSC having no control data written therein. Then, after the dummy information has been recorded, the process proceeds to step S112.

Then, in step S112, the process allows the semiconductor laser LD to emit the read beam to read the control data already recorded or the dummy information written within the calibration area in step S110 in response to the information write disc DSC loaded.

Upon reading the aforementioned control data or dummy information, the control unit 22 supplies the voltage value data V1 to V5 pre-stored in the lookup memory 19a to the liquid crystal drive unit 18 to drive the liquid crystal device LCD in accordance with the drive signals Sc1 to Sc5 having voltage values proportional to the voltage value data V1 to V5, thereby making a tilt correction. Furthermore, the control unit 22 makes the optimum tilt correction by changing the voltage value data V1 to V5 until the RF amplifier unit 15 delivers the RF signal SRF with the maximum amplitude.

Then, each of the voltage value data V1, V2, V3, V4, and V5 of the drive signals Sc1 to Sc5 at which the RF signal SRF provides the maximum amplitude is defined as reference correction quantity data Vc1, Vc2, Vc3, Vc4, and Vc5, which is in turn stored in the measurement value memory 19b.

Furthermore, at the maximum amplitude of the RF signal SRF, the control unit 22 acquires the tilt error data De that is detected by the tilt sensor 11 and delivered from the A/D converter 17 to define the tilt error data De as reference tilt error data Tebase, which is in turn associated with the reference correction quantity data Vc1, Vc2, Vc3, Vc4, and Vc5 and stored in the measurement value memory 19b.

Figure 5:
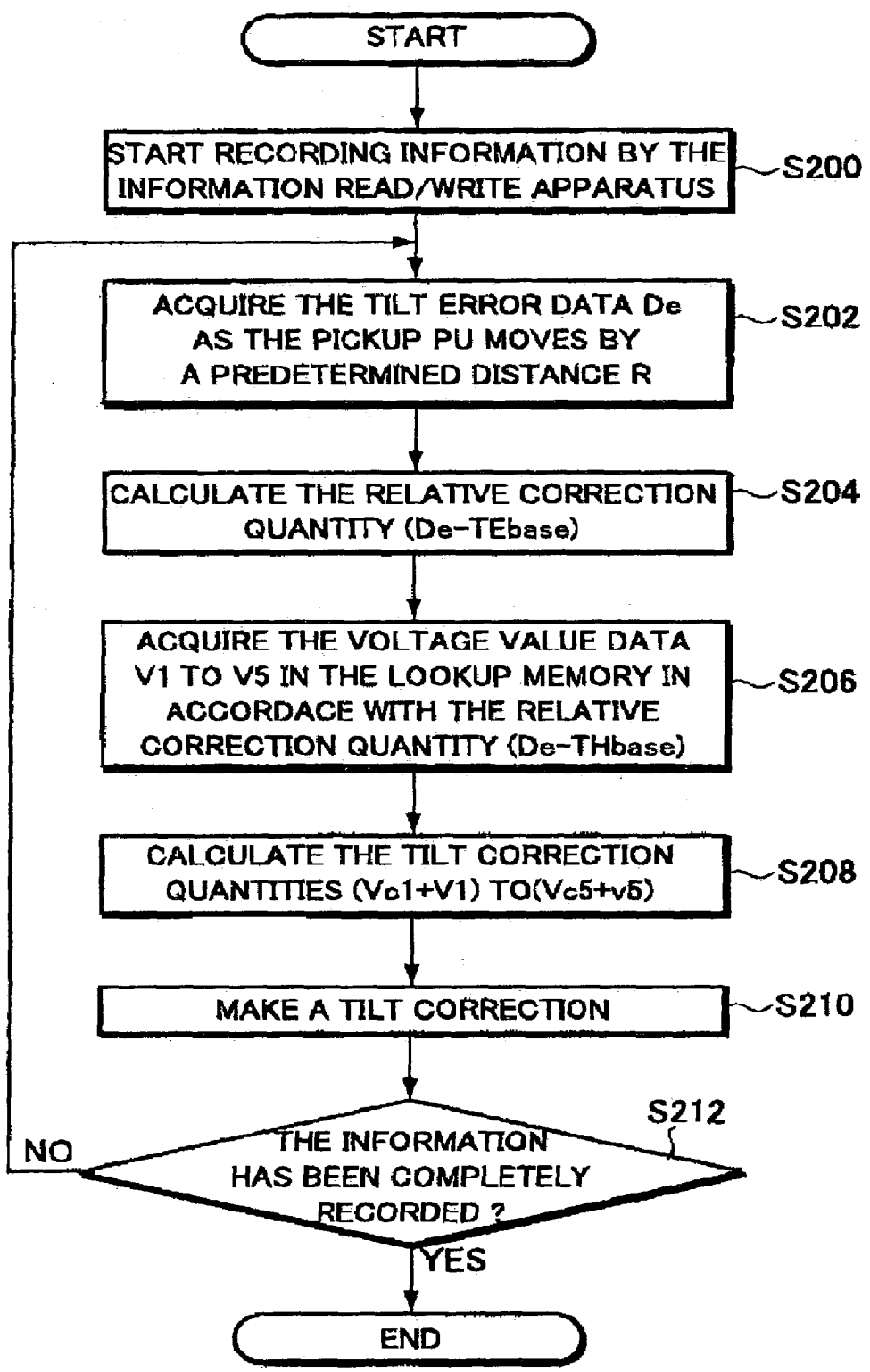
FIG. 5 is an explanatory flowchart illustrating the operation of a tilt servo system upon recording information.
Figure 6:
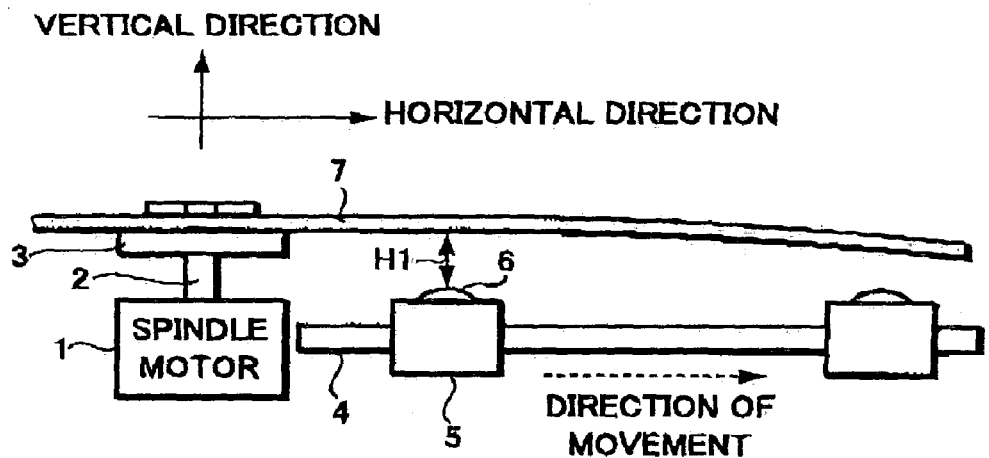
FIGS. 6A to 6C are explanatory views illustrating the technical background the inventor has had in relation to a second embodiment.
Figure 6:
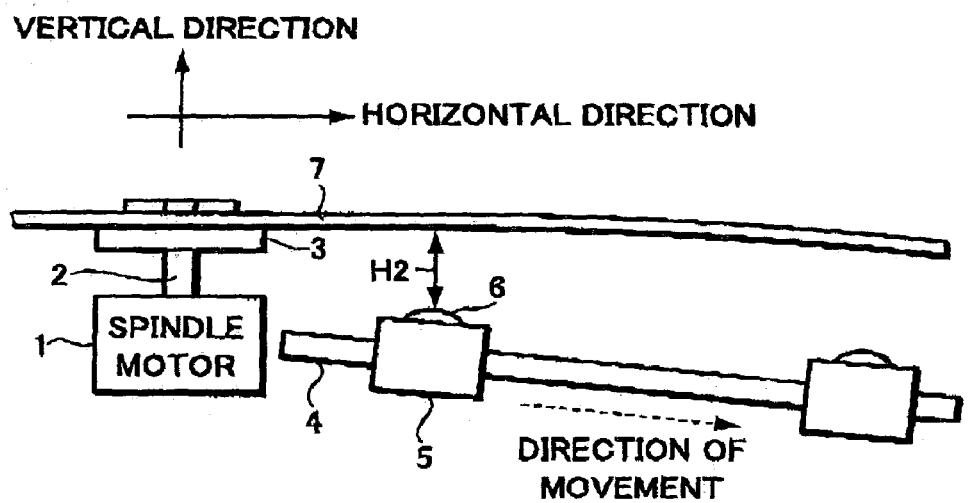
Figure 6:
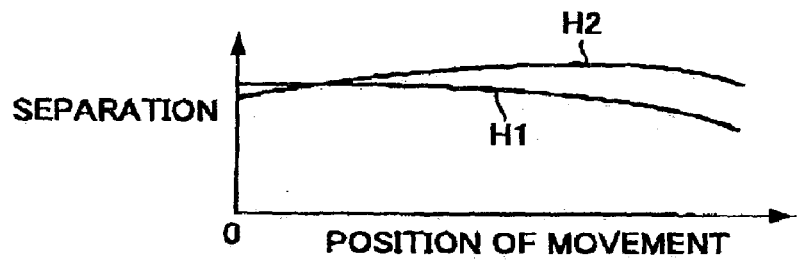
Figure 7:
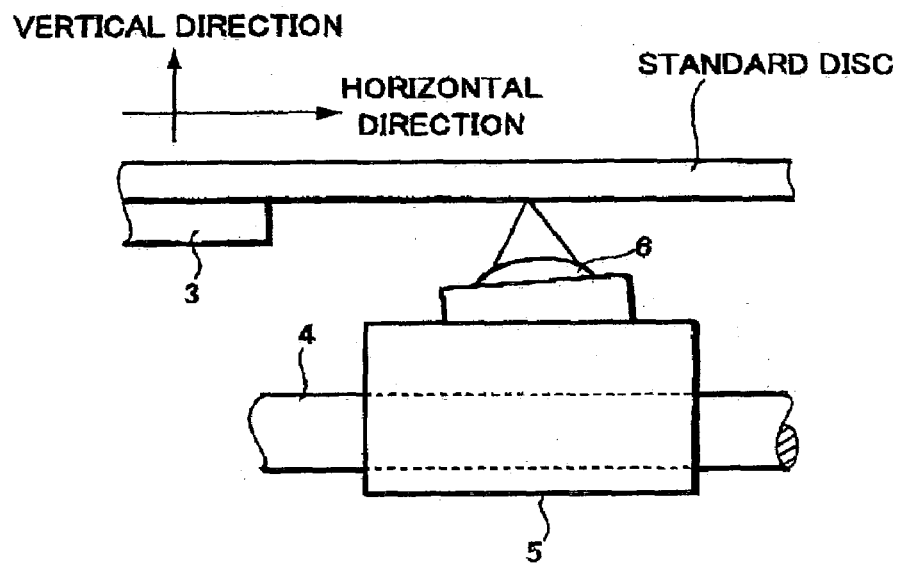
FIGS. 7A and 7B are further explanatory views illustrating the technical background the inventor has had in relation to the second embodiment.
Figure 7:
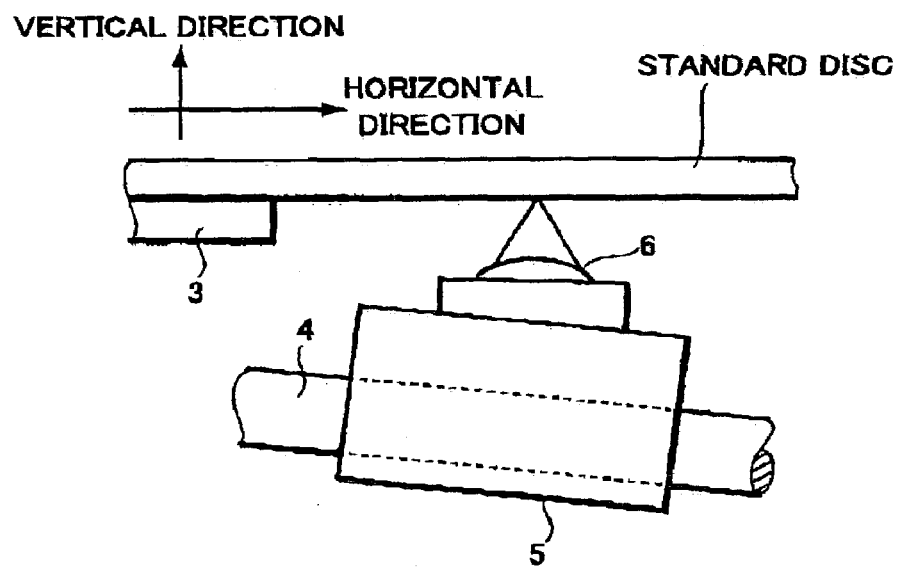

Then, the process completes the pre-processing at the end of the processing in step S112, and then proceeds to the processing for actually recording information as shown in FIG. 5.

As described above, during the pre-processing, the process is adapted to make the first tilt correction for the lead-in area of the information write disc DSC located close to the rotating shaft 9 of the spindle motor 8 to determine the reference correction quantity data Vc1, Vc2, Vc3, Vc4, and Vc5 corresponding to the actual inclination of the turntable 10 and the fundamental inclination of the information write disc DSC supported by the turntable 10 and the reference tilt error data TEbase.

Although detailed later, upon actually recording information as shown in FIG. 5, a tilt correction is made in accordance with the reference correction quantity data Vc1, Vc2, Vc3, Vc4, and Vc5 and the reference tilt error data TEbase, thereby allowing the tilt correction to be made with high accuracy, e.g., even when the positional relationship between the objective lens L2 and the tilt sensor 11 has changed causing the sensor output of the tilt sensor 11, i.e., the tilt error signal Se to be varied.

Now, referring to FIG. 5, the tilt correction operation for actually recording information will be explained below.

First, in step S200, the information read/write apparatus starts writing information.

Then, in step S202, while the information is being continually recorded, the control unit 22 detects that the pickup PU has moved by a predetermined distance R in the radial direction of the information write disc DSC, and subsequently acquires the tilt error data De that has been detected by the tilt sensor 11 at that time and delivered by the A/D converter 17.

In the foregoing, the control unit 22 examines the amount of drive of the carriage motor provided to carry the pickup PU, thereby detecting the distance R traveled by the pickup PU.

Then, in step S204, the control unit 22 reads the reference tilt error data TEbase from the measurement value memory 19b to calculate the difference value (De−TEbase) between the reference tilt error data TEbase and the tilt error data De as a relative correction quantity.

Then, in step S206, the control unit 22 retrieves the tilt error data having the value closest to the relative correction quantity (De−TEbase) from among the tilt error data, Der (Δθ) to Der (n×Δθ) and Der (−Δθ) to Der (−n×Δθ), which is pre-stored in the lookup memory 19a as shown in FIG. 3A, and further acquires the voltage value data V1, V2, V3, V4, and V5 corresponding to the tilt error data retrieved.

For example, if the relative correction quantity (De−TEbase) is the closest to the tilt error data Der (2×Δθ), the voltage value data V1(2×Δθ) to V5(2×Δθ) is acquired.

Then, in step S208, the voltage value data V1, V2, V3, V4, and V5 acquired as described above and the reference correction quantity data Vc1, Vc2, Vc3, Vc4, and Vc5 is added, respectively, thereby calculating the tilt correction quantities (Vc1+V1), (Vc2+V2), (Vc3+V3), (Vc4+V4), and (Vc5+V5).

Then, in step S210, the aforementioned tilt correction quantities (Vc1+V1), (Vc2+V2), (Vc3+V3), (Vc4+V4), and (Vc5+V5) are supplied to the liquid crystal drive unit 18 to drive the liquid crystal device LCD by the drive signals Sc1, Sc2, Sc3, Sc4, and Sc5 at voltage values equivalent to those tilt correction quantities, thereby allowing a tilt correction to be made and the time delay distribution having occurred in the liquid crystal device LCD to be sustained until the subsequent tilt correction is made.

Then, in step S212, the process determines whether the information that should be recorded has been completely written. The process then exits the processing for writing information it all the information has been completely recorded, but returns to step S202 to repeat the processing if the information has not yet been completely recorded.

The processing in step S202 to S212 repeated as described above allows the difference between the tilt error data De and the reference tilt error-data TEbase, i.e., the relative correction quantity (De−TEbase) to be determined each time the pickup PU moves radially at a predetermined distance R in order to variably control the voltage, values of the drive signals Sc1 to Sc5 for tilt correction in accordance with the tilt correction quantities (Vc1+V1) to (Vc5+V5) obtained through the adjustment by the relative correction quantity (De−TEbase) with respect to the reference correction quantity data Vc1, Vc2, Vc3, Vc4, and Vc5.

As a result, even when the tilt error signal Se or the sensor output from the tilt sensor 11 varies, e.g., due to a change in the positional relationship between the objective lens L2 and the tilt sensor 11, it is possible to make a tilt correction with high accuracy.

That is, even when the positional relationship between the objective lens L2 and the tilt sensor 11 changes, an adjustment of the reference correction quantity data Vc1, Vc2, Vc3, Vc4, and Vc5 made in response to the relative correction quantity (De−TEbase) or the difference value between the tilt error data De and the reference tilt error data TEbase, which occurs during actual information recording, provides the correction quantity data (Vc1+V1) to (Vc5+Vc5) from which the influence resulting from the change is removed.

For this reason, it is possible to make a tilt correction with high accuracy by the voltage values of the drive signals Sc1, Sc2, Sc3, Sc4, and Sc5 being set in accordance with the tilt correction quantities (Vc1+V1) to (Vc5+V5) to drive the liquid crystal device LCD.

The tilt servo system according to this embodiment is designed to make tilt corrections by providing control to the voltages of the drive signals Sc1 to Sc5 supplied to the liquid crystal device LCD, however, the orientation of the objective lens L2 may also be adjusted to make tilt corrections.

That is, as a modified example of this embodiment, the liquid crystal device LCD and the liquid crystal drive unit 18 illustrated in FIG. 1 can be eliminated and a tilt actuator for variably adjusting the orientation of the objective lens L2 can be provided in the pickup PU.

Additionally, in the experiment process before the shipment of the product, the standard disc is loaded and successively inclined at fine predetermined angular intervals of $\pm\Delta\theta$ so as to produce various tilt angles $\theta$. At the respective tilt angles $\pm\Delta\theta$, $\pm2\times\Delta\theta$, $\pm3\times\Delta\theta$, . . . , and $\pm n\times\Delta\theta$, measurements are empirically made on the tilt error data Der that is detected by the tilt sensor 11 and delivered from the A/D converter 17.

Furthermore in order to adjust the orientation of the objective lens L2 at the angles at which the respective tilt angles $\pm\Delta\theta$, $\pm2\times\Delta\theta$, $\pm3\times\Delta\theta$, . . . , and $\pm n\times\Delta\theta$ can be each cancelled out, a drive voltage supplied to the aforementioned tilt actuator is empirically measured. The data on the drive voltage measured and the tilt error data Der is prestored in the lookup memory 19a as a lookup table similar to that shown in FIG. 3.

Then, upon the aforementioned pre-processing shown in FIG. 4, the first tilt correction is made on the lead-in area of the information write disc DSC. The optimum voltage applied to the tilt actuator upon the tilt correction (i.e., the voltage applied at the maximum amplitude of the RF signal SRF) is then stored in the measurement value memory 19b as the reference correction quantity data Vc. The tilt error data De delivered by the A/D converter 17 upon the tilt correction is also stored in the measurement value memory 19b as the reference tilt error data TEbase.

Furthermore, upon recording information as described above with reference to FIG. 5, each time the pickup PU moves by a predetermined distance R, the relative correction quantity (De−TEbase) or the difference value between the tilt error data De delivered by the A/D converter 17 and the reference tilt error data TEbase is determined. The drive voltage data closest to the relative correction quantity (De−TEbase) is retrieved from the lookup table in the lookup memory 19a, and the resulting drive voltage data is added to the reference correction quantity data Vc to thereby find the tilt correction quantity.

Then, the drive voltage equivalent to the tilt correction quantity is applied to the tilt actuator to adjust the orientation of the objective lens L2, thereby making a tilt correction.

As described above, a tilt correction can be made with high accuracy by adjusting the drive voltage applied to the tilt actuator for variably adjusting the orientation of the objective lens L2 for the tilt correction instead of adjusting the time delay distribution of the liquid crystal device LCD.

Second Embodiment

Now, a second embodiment of the present invention will be explained with reference to FIGS. 6 to 13.

This embodiment relates to a tilt servo system which is capable of making tilt corrections without a tilt sensor.

First, described is the technical background which the inventor has been involved to develop the tilt servo system according to this embodiment.

The inventor devised a tilt servo system which, instead of directly detecting by a tilt sensor the tilt angle between an objective lens provided in the pickup and a disc, automatically measures the separation between the objective lens in focus and the disc and estimates the measured value as a quantity equivalent to the tilt angle to adjust the angle of the objective lens, thereby making it possible to prevent the occurrence of a tilt error.

That is, as schematically illustrated in FIG. 6A, a shaft 4 having a slider mechanism for slidably supporting a pickup 5 is disposed in parallel to a turntable 3 provided at the right angle to a rotating shaft 2 of a spindle motor 1.

Then, a focus servo drive current supplied to a focus actuator is measured when the pickup 5 is moved in the radial direction of a disc 7 placed on the turntable 3 to focus an objective lens 6 provided on the pickup 5 at a plurality of positions of movement.

That is, the measurements of the drive current made when focus is achieved allow the separation Hi to be determined between the objective lens 6 and the disc 7.

The difference between two measurements obtained at two adjacent positions of movement (i.e., the difference between the separations between the objective lens 6 and the disc 7 at the respective adjacent positions of movement) was estimated as a quantity equivalent to the tilt angle to make a tilt correction to the angle of the objective lens 6.

The tilt servo system at this research and development stage has the first condition that the disc placement surface of the turntable 3 is parallel to the shaft 4. Furthermore, the second condition is that when the pickup 5 is moved along the shaft 4 with a flat standard disc having no distortion or the like being placed on the turntable 3, the angle between the recording surface of the disc and the optical axis of the objective lens 6 is pre-adjusted so as to be always the right angle without having to make a tilt correction.

Accordingly, for example, suppose that information is recorded onto a disc 7 having a distortion or the like at the time of an actual use after the shipment of the product In this case, since the aforementioned measurements vary as illustrated by the characteristic curve H1 in FIG. 6C as the pickup 5 moves in the radial direction of the disc 7, it is possible to determine the difference between two measurements obtained at adjacent positions of movement, thereby estimating a quantity equivalent to a tilt angle.

However, this tilt servo system cannot make tilt corrections with high accuracy unless the aforementioned two conditions are satisfied at the same time.

For example, in the assembly process for attaching the pickup 5 to the shaft 4 to form into a so-called traverse mechanism, it is a common practice to attach a pickup 5 which has already been pre-assembled as a single unit to the shaft 4.

Then, if the angle between the optical axis of the objective lens 6 and the standard disc is not the right angle as schematically shown in FIG. 7A as a result of attaching the pickup 5 to the shaft 4, the shaft 4 is inclined with the vicinity of the turntable 3 employed as a fulcrum to thereby adjust the angle of the objective lens 6.

The shaft 4 inclined as such dissatisfies the aforementioned two conditions. As a result, as shown in FIG. 6B, when the pickup 5 moves in the radial direction of the disc 7, for example, to record information onto the disc 7 having a distortion or the like, the measurements of focus servo drive current obtained when focus is achieved vary as shown by the characteristic curve H2 illustrated in FIG. 6C, for example.

That is, as shown by the characteristic curves H1 and H2 illustrated in FIG. 6C, a difference occurs in the measurements between the case where the shaft 4 is parallel as shown in FIG. 6A and the case where the shaft 4 is inclined as shown in FIG. 6B.

For this reason, the shaft 4 inclined as shown in FIG. 6B raised a problem of causing degradation in the accuracy of tilt corrections.

In this context, a tilt servo system according to the present invention was developed which provides high accuracy and high reliability without a tilt sensor even when the shaft 4 is inclined.

Now, referring to the block diagram illustrated in FIG. 8, the configuration of the tilt servo system according to this embodiment will be described.

Figure 8:
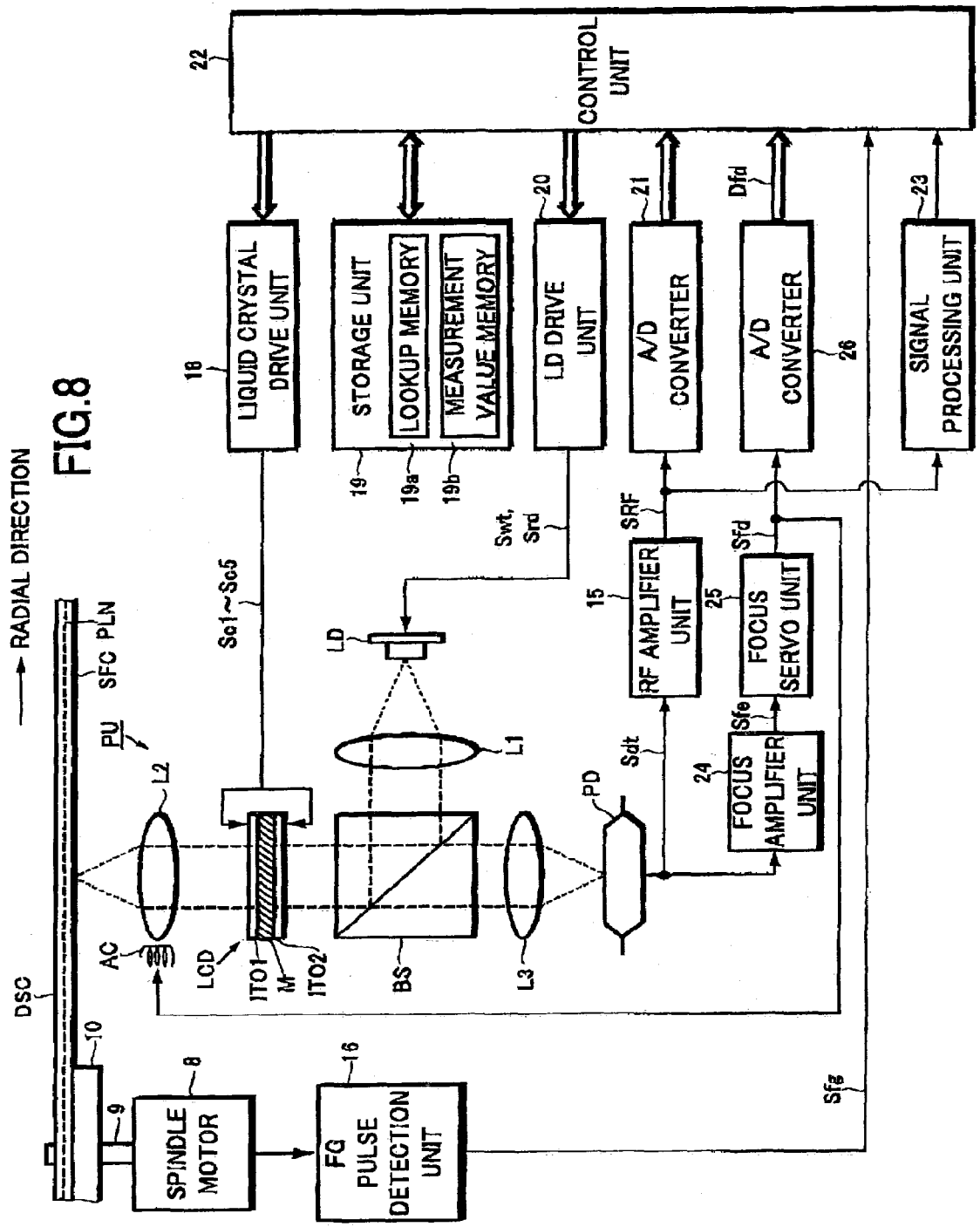
FIG. 8 is a block diagram illustrating the configuration of a tilt servo system according to the second embodiment.

The components in FIG. 8 which are the same as or equivalent to those shown in FIG. 1 are indicated by the same reference symbols.

This tilt servo system and the tilt servo system described as the first embodiment are different in that this tilt servo system is configured such that the tilt sensor 11 and the A/D converter 17 shown in FIG. 1 are eliminated.

Furthermore, the pickup PU is provided with a focus actuator AC for adjusting the position of the objective lens L2.

Furthermore, the information read/write apparatus is provided with a focus amplifier unit 24 for extracting a focus error signal Sfe from an optoelectronically converted signal Sdt delivered from the light-receiving device PD, and a focus servo unit 25 for focusing the objective lens L2 on the recording surface PLN of the disc DSC by supplying a drive signal Sfd to the focus actuator AC to adjust the focus error signal Sfe to be equal to a predetermined target value (zero in this embodiment).

An A/D converter 26 converts the drive signal Sfd to drive data Dfd in digital form, which is in turn entered to the control unit 22.

In the foregoing, when the objective lens L2 is focused on the recording surface PLN of the disc DSC, the level of the drive signal Sfd at this time is equivalent to the separation between the objective lens L2 and the recording surface PLN.

In this context, the control unit 22 is adapted to accurately detect the separation between the objective lens L2 and the recording surface PLN in accordance with the drive data Dfd delivered from the AID converter 26 when focus is achieved.

Figure 2:
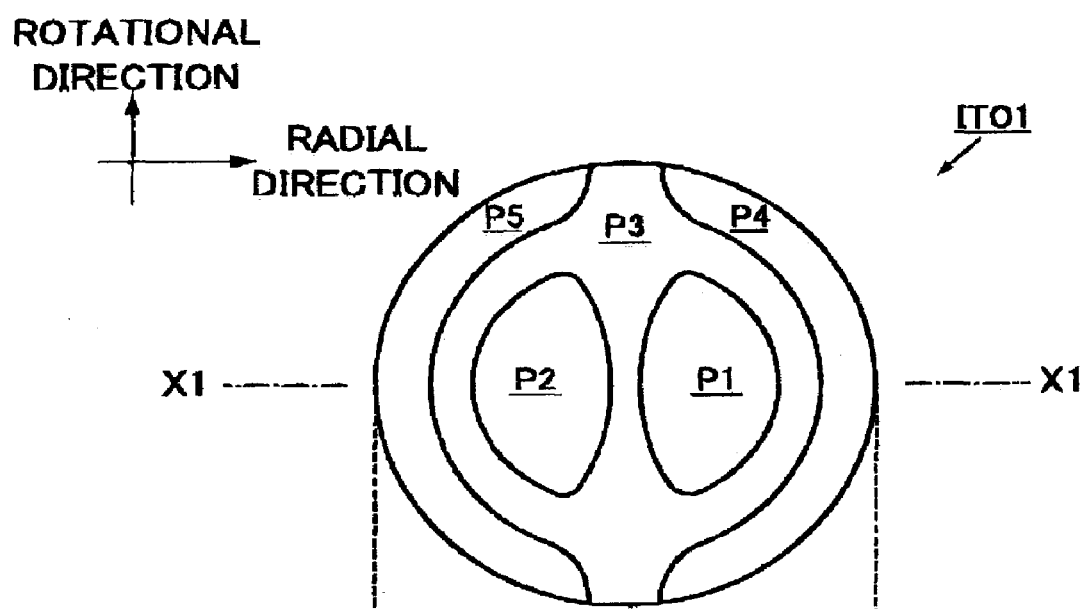
FIGS. 2A and 2B are explanatory views illustrating the structure and operation of a liquid crystal device.
Figure 2:
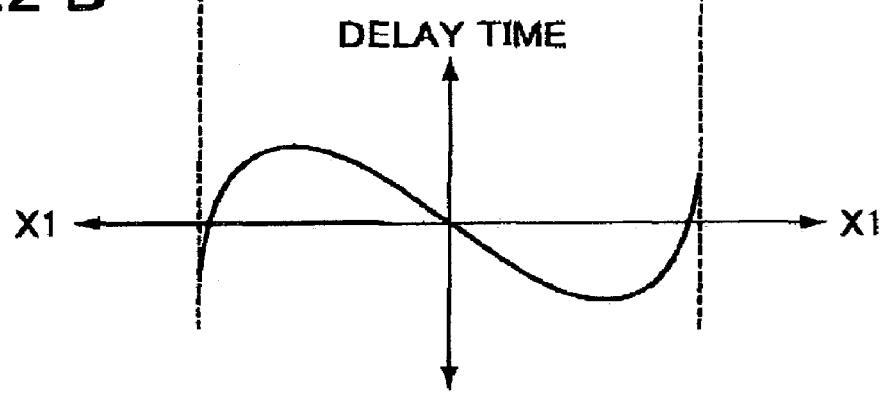

The liquid crystal device LCD has the same structure as the one shown in FIGS. 1 and 2, where the drive signals Sc1 to Sc5 supplied from the liquid crystal drive unit 18 under the control of the control unit 22 produce a time delay distribution in the liquid crystal layer M to provide an aberration opposite to the coma occurring in the light incident layer SFC of the disc DSC. Accordingly, when a write beam is incident from the half mirror BS side to record information, the liquid crystal device LCD transmits a write beam having its wavefront corrected according to the time delay distribution toward the objective lens L2, thus allowing a light beam capable of preventing the effect of the tilt angle produced between the objective lens L2 and the information write disc DSC to be incident upon the recording surface PLN of the information write disc DSC.

As shown in FIG. 9, pre-stored as a lookup table in the lookup memory 19a is the voltage value data V1 to V5 indicative of the voltage values of the drive signals Sc1 to Sc5 which are capable of making tilt corrections at each of the tilt angles pre-measured at the experiment process or the like.

That is, in an experiment process or the like before the shipment of the product, a standard disc which has no distortion or the like and is compliant with specifications is loaded and successively inclined at predetermined fine angular intervals of $\pm\Delta\theta$ so as to produce various tilt angles $\theta$. At the respective tilt angles $\pm\Delta\theta$, $\pm2\times\Delta\theta$, $\pm3\times\Delta\theta$, . . . , and $\pm n\times\Delta\theta$, the voltage value data V1 to V5 is empirically measured which is indicative of each voltage value of the drive signals Sc1 to Sc5 that allows the liquid crystal device LCD to produce a time delay distribution capable of making tilt corrections.

Then, the respective tilt angles $\pm\Delta\theta$, $\pm2\times\Delta\theta$, $\pm3\Delta\theta$, . . . , and $\pm n\times\Delta\theta$ and the voltage value data V1 to V5 are associated with each other to prepare a lookup table, which is pre-stored in the lookup memory 19a.

The measurement value memory 19b is provided as a record area for preparing a correction quantity data table, which will be described later, and a work area for computing a tilt correction quantity.

As shown in FIGS. 6A and 6B, the entire pickup PU is slidably provided on a shaft having a slider mechanism and the inclination of the shaft is further adjusted in advance in the assembly process, thereby adjusting the angle of the objective lens L2 such that the optical axis of the objective lens L2 is perpendicular to a flat standard disc placed on the turntable.

Figure 10:
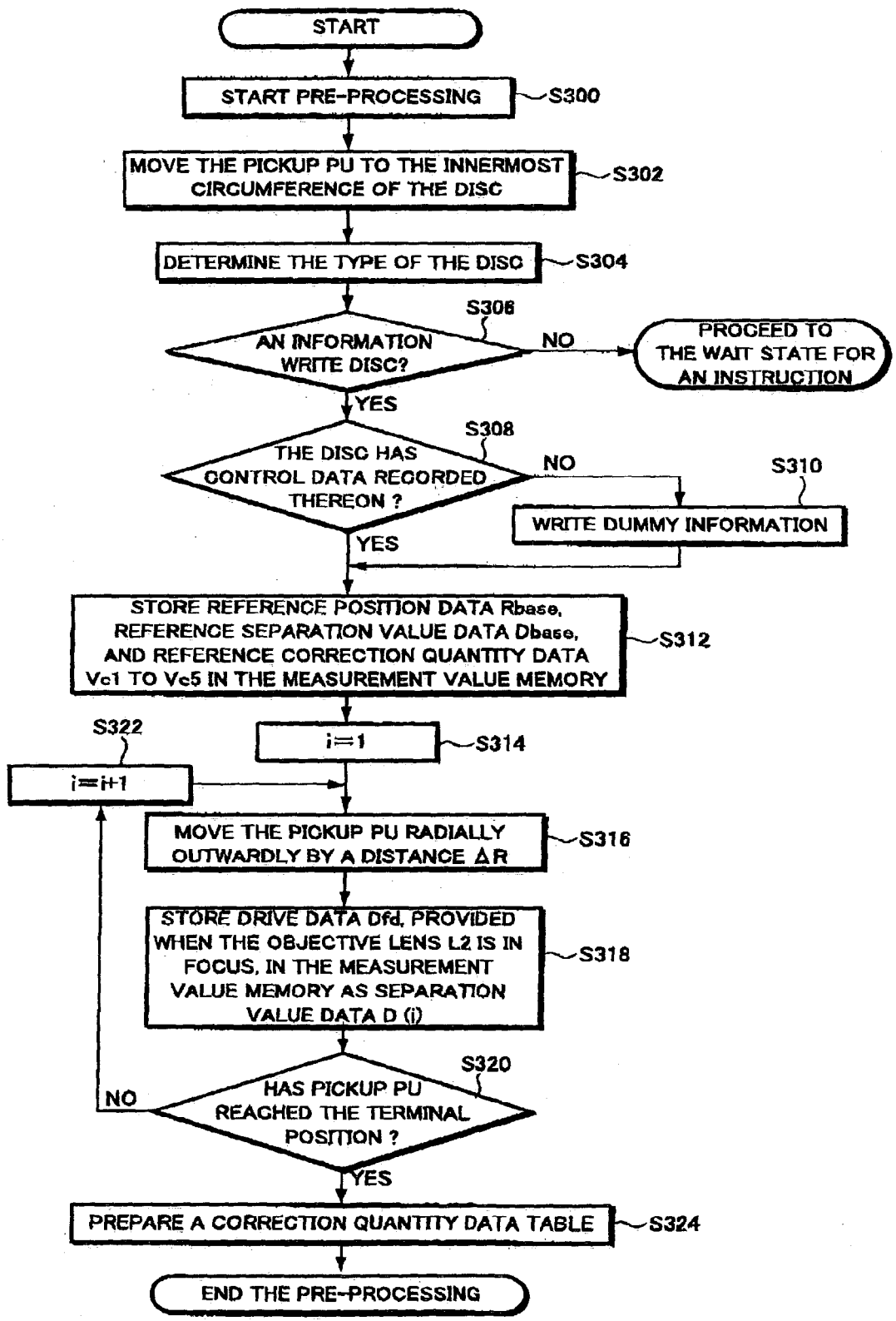
FIG. 10 is an explanatory flowchart illustrating the operation of the tilt servo system according to the second embodiment in a pre-processing step.
Figure 11:
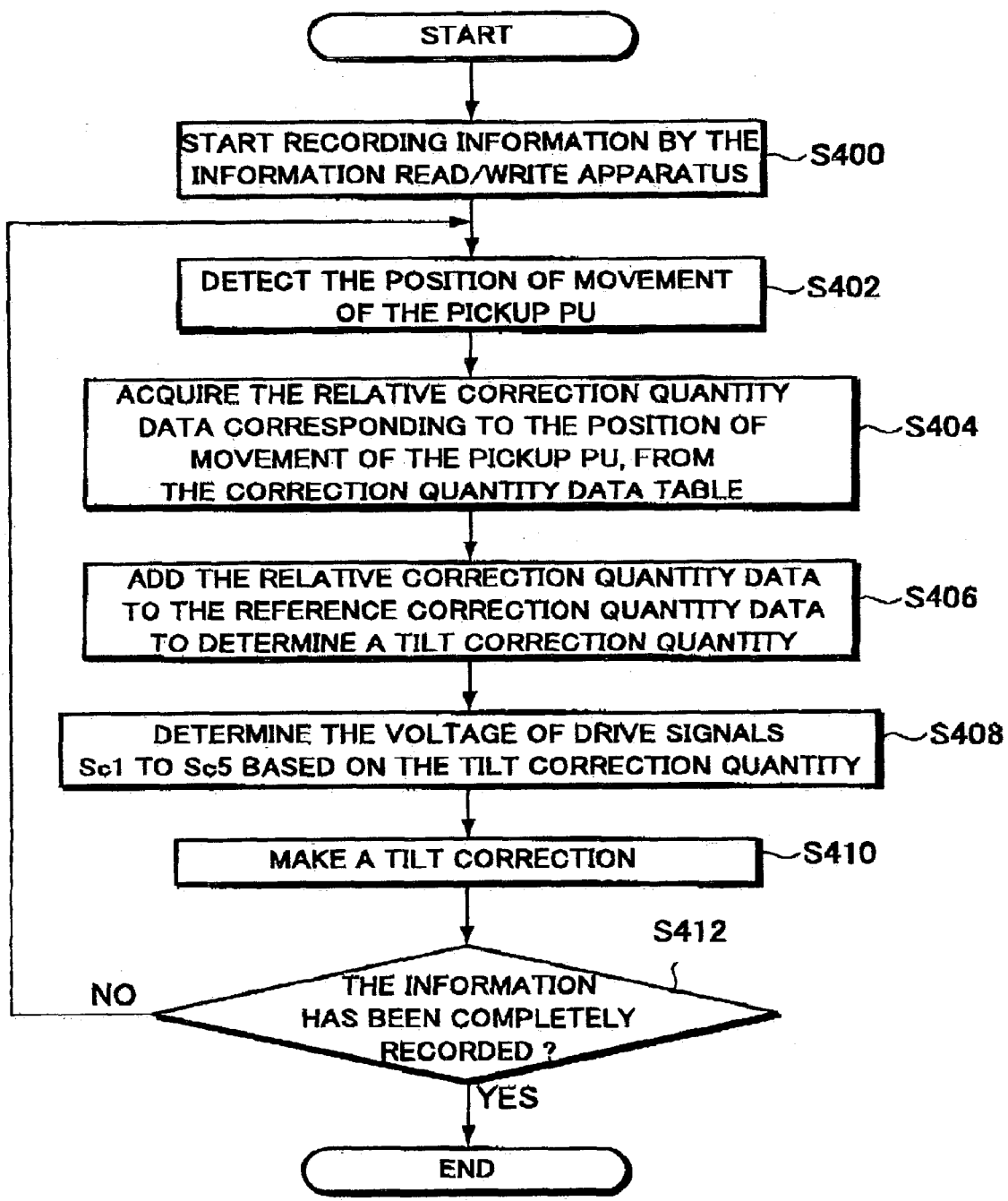
FIG. 11 is an explanatory flowchart illustrating the operation of the tilt servo system according to the second embodiment upon recording information.

Now, the operation of this tilt servo system configured as such will be described with reference to FIGS. 10 to 13. FIGS. 10 and 11 show explanatory flowcharts illustrating the operation of this tilt servo system.

This tilt servo system is capable of appropriately providing tilt servo control for either information reproduction or information recording. However, in either case, since the same tilt servo control is provided, the operation of the tilt servo system for writing information will be mainly described by way of example.

Referring to FIG. 10, when a user loads his/her desired disc DSC onto the turntable 10, the processing for writing information is started automatically or in accordance with a user's instruction.

First, in step S300, as in the first embodiment, the control unit 22 starts the pre-processing for making a predetermined preparation before the information read/write apparatus starts writing information.

When the pre-processing is started, the same processing as that described in steps S102 to S110 shown in FIG. 4 is also performed in step S302 to S310.

That is, the pickup PU is moved to the innermost circumferential side of the disc DSC (step S302), the type of the disc DSC loaded is determined (step S304), and when having determined in step S306 that an information write disc was not loaded, the process provides the user with an indication for this and is then placed in the wait state for an instruction.

On the other hand, when having determined that an information write disc was loaded, the process further determines whether control data is recorded in the lead-in area of the information write disc DSC (step S308). The process proceeds to step S312 if the control data is recorded, whereas if no control data is recorded, the process allows dummy information to be written in a calibration area of the lead-in area in step S310 and then proceeds to step S312.

Then, in step S312, the pickup PU is moved toward the area of the information write disc DSC in which the control data or the dummy information is recorded. With that position of movement employed as a reference position, the process allows the data Rbase indicative of that reference position (hereinafter referred to as the "reference position data") to be stored in the measurement value memory 19b. That is, with a predetermined position close to the turntable 10 being employed as the reference position, the reference position is stored as the reference position data Rbase in the measurement value memory 19b.

Furthermore, the process allows the semiconductor laser LD to emit the read beam to read the control data or the dummy information stored at the aforementioned reference position.

Upon reading the aforementioned control data or dummy information, the process allows the focus servo unit 25 to control the focus actuator AC in order to focus the objective lens L2, and at the same time, the control unit 22 supplies to the liquid crystal drive unit 18 the voltage value data V1 to V5 that is pre-stored in the lookup memory 19a to drive the liquid crystal device LCD in accordance with the drive signals Sc1 to Sc5 having voltage values proportional to the voltage value data V1 to V5, thereby making tilt corrections.

Then, the control unit 22 makes finally the optimum tilt correction by changing the voltage value data V1 to V5 as appropriate until the RF amplifier unit 15 delivers the RF signal SRF with the maximum amplitude. That is, by detecting the condition that the RF signal SRF with the maximum amplitude has been delivered, the process determines that an optimum tilt correction has been made when focus is achieved.

Furthermore, the control unit 22 defines the drive data Dfd delivered from the A/D converter 26 at the maximum amplitude of the RF signal SRF as the reference separation value data Dbase indicative of the accurate separation between the recording surface PLN of the disc DSC and the objective lens L2, while the voltage value data V1, V2 V3 V4, and V5 that is also set at the maximum amplitude of the RF signal SRF is defined as the reference correction quantity data Vc1, Vc2, Vc3, Vc4, and Vc5.

Then, the reference separation value data Dbase and the reference correction quantity data Vc1, Vc2, Vc3, Vc4, and Vc5 is associated with the reference position data Rbase and stored in the measurement value memory 19b.

As described above, since the objective lens L2 is in focus and the liquid crystal device LCD is ready to make optimum tilt corrections at the maximum amplitude of the RF signal SRF, the reference separation value data Dbase is equivalent to the accurate separation between the recording surface PLN of the information write disc DSC and the objective lens L2, and the voltage value data V1, V2, V3, V4, and V5 provided at that time (i.e., the reference correction quantity data Vc1, Vc2, Vc3, Vc4, and Vc5) is the voltage value that can make an optimum tilt correction.

In this context, the reference separation value data Dbase and the reference correction quantity data Vc1, Vc2, Vc3, Vc4, and Vc5 is associated with the reference position data Rbase and stored in the measurement value memory 19b in order to be employed as the condition for the optimum tilt correction at the reference position.

Then, in step S314, the process sets a variable i, which the control unit 22 employs to control the repetition of processing, to 1, and thereafter proceeds to step S316.

In step S316, the pickup PU is moved by a predetermined distance $\Delta R$ outwardly in the radial direction (to the outer circumferential side) of the information write disc DSC.

Then, in step S318, the control unit 22 provides focus servo control to focus the objective lens L2 and receives the drive data Dfd provided at that time.

Then, the control unit 22 allows the drive data Dfd entered to be associated with the distance $\Delta R$ traveled by the pickup PU and stored in the measurement value memory 19b as the separation value data D(i) indicative of the separation between the recording surface PLN of the information write disc DSC and the objective lens L2.

The control unit 22 also receives the drive data Dfd equivalent to the drive signal Sfd supplied from the focus servo unit 25 to the focus actuator AC to focus the objective lens L2, and further allows the drive data Dfd to be associated with the position of movement of the pickup PU and stored in the measurement value memory 19b as the separation value data D(i) indicative of the accurate separation between the recording surface PLN and the objective lens L2.

Then, in step S320, the process determines whether the position of movement of the pickup PU has reached the terminal position within a predetermined movable range. If the position has not yet been reached, the process increments the variable i by one in step S322 and then repeats the processing from step S316, whereas if the pickup PU has reached the terminal positions the process proceeds to step S324.

Accordingly, the control unit 22 repeats the processing from step S316 to S322 to thereby store the drive data Dfd, provided when the objective lens L2 is focused, successively in the measurement value memory 19b as the separation value data D(i) each time the pickup PU is moved by the predetermined distance $\Delta R$ outwardly in the radial direction of the information write disc DSC. When the separation value data D(i) has been completely stored over the entire movable range in the radial direction of the information write disc DSC, the process proceeds to step S324.

Then, in step S324, a correction quantity data table is prepared.

That is, using the reference separation value data Dbase, the reference position data Rbase, and a plurality of pieces of separation value data D(i), which are stored in the measurement value memory 19b, angles of inclination $\theta i$ are determined at intervals of the distance $\Delta R$.

Figure 12:
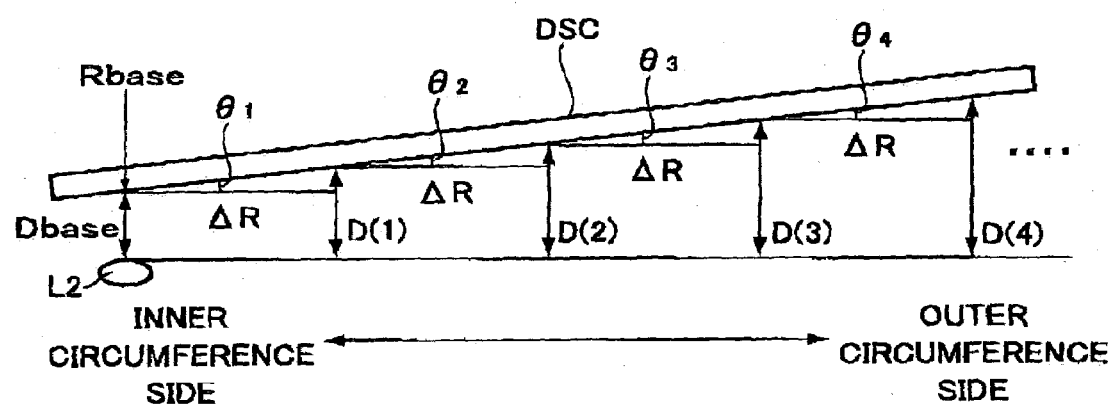
FIG. 12 is a schematic view illustrating the principle of calculating an angle of inclination and a relative correction quantity.

That is, as schematically shown in FIG. 12, the difference (D(1)−Dbase) between the separation value data D(1) obtained by the objective lens L2 being first moved by the distance $\Delta R$ and the reference separation value data Dbase is determined. Then, the ratio (D(1)−Dbase)/$\Delta R$ of the difference (D(1)−Dbase) to the distance $\Delta R$ is applied to the following equation (1), thereby determining the angle of inclination $\theta 1$ at the first distance $\Delta R$ from the reference position Rbase.

$$\theta 1 = \tan^{-1}[(D(1)-Dbase)/\Delta R] \quad (1)$$

Furthermore, using the separation value data D(1) and the separation value data D(2) obtained by the distance 2×$\Delta R$ being traveled from the reference position Rbase, the following equation (2) is computed to thereby determine the angle of inclination $\theta 2$ at the 2×$\Delta R$ from the distance $\Delta R$.

$$\theta 2 = \tan^{-1}[(D(2)-D(1))/\Delta R] \quad (2)$$

Furthermore in a like manner, using the separation value data D(i) and D(i−1) obtained at adjacent positions of movement, the following equation (3) is computed to thereby determine the angles of inclination $\theta 3$ and $\theta 4$, and so forth at the remaining positions of movement.

$$\theta i = \tan^{-1}[(D(i)-D(i-1))/\Delta R] \quad (3)$$

The angles of inclination θ1, θ2, θ3, and θ4 and so forth, determined as such, represent the sum of the angle of inclination of the shaft and the angle of inclination at each portion of the disc DSC.

To cancel out the inclination of the shaft, θ1 containing the fundamental angle of inclination of the shaft is subtracted from each of the aforementioned angles of inclination θ2, θ3, θ4 and so forth.

That is, this gives that θ21=(θ2−θ1), Δθ31=(θ3−θ1), Δθ41=(θ4−θ1) and so forth, where Δθ21, Δθ31, Δθ4 and so forth represent the respective differences between the angles of inclination θ2, θ3, θ4 and so forth and the aforementioned θ1. As a result of canceling out the inclination of the shaft, it is possible to accurately determine the angle of inclination at each portion of the disc DSC.

Then, by the tilt angle being set to zero at the reference position identified by the reference position data Rbase, the angular difference (0, Δθ21, Δθ31, Δθ41, and so forth) at each distance ΔR from the aforementioned reference position is defined as the relative correction quantity data. Then, the relative correction quantity data (0, Δθ21, Δθ31, Δθ41, and so forth) at each distance ΔR is prepared as a correction quantity data table, which is in turn stored in the measurement value memory 19b.

Figure 13:
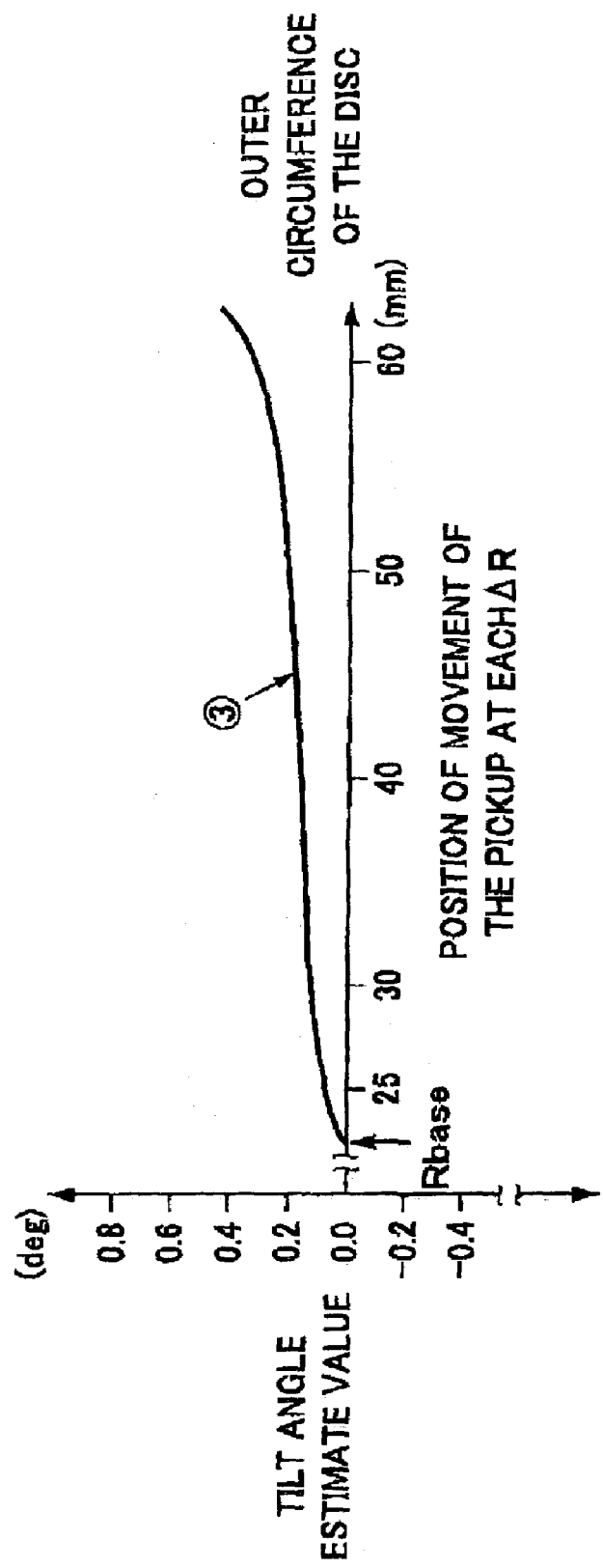
FIG. 13 is a schematic view illustrating the contents of a correction quantity data table.
Figure 14:
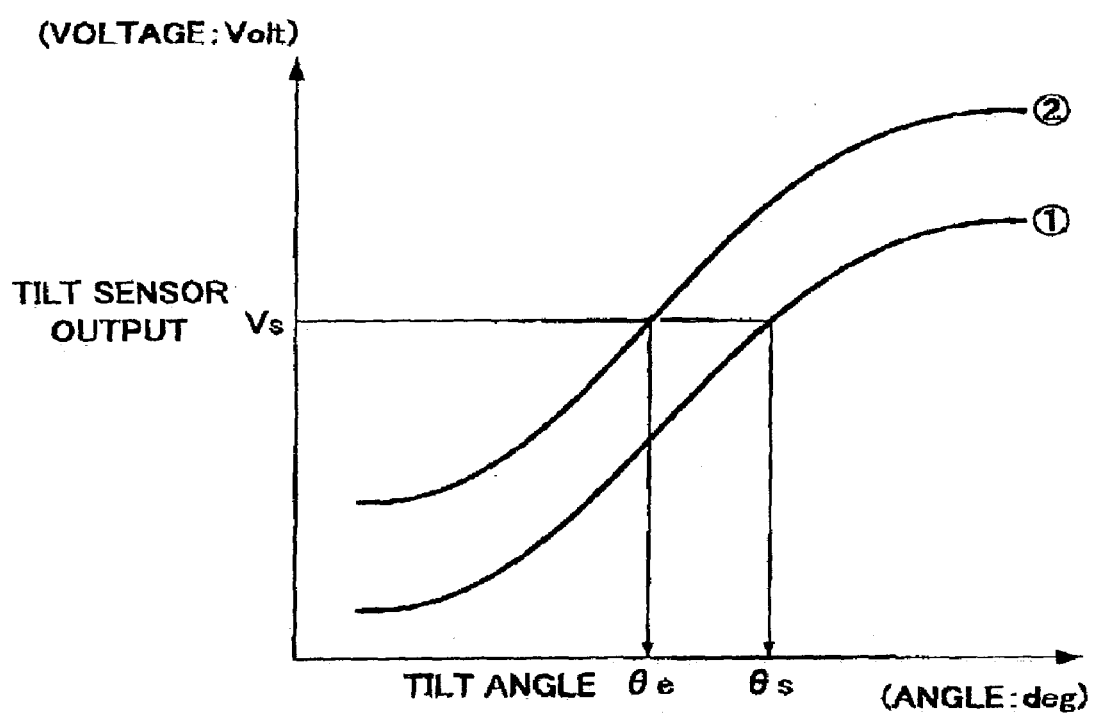
FIG. 14 is an explanatory view illustrating problems with a prior art tilt servo.

Accordingly, the correction quantity data table as represented by the characteristic curve (3) shown in FIG. 13 with the inclination of the shaft cancelled out is stored in the measurement value memory 19b.

The pre-processing is completed when the correction quantity data table has been prepared as described above, and the process proceeds to the processing for actually writing information as shown in FIG. 11.

Although detailed later with reference to FIG. 11, upon actually writing information, each time the pickup PU moves by a distance ΔR with respect to the reference position (the position shown by symbol Rbase in FIG. 13), the relative correction quantity data corresponding to those positions of movement is retrieved in the correction quantity data table The voltage value data V1 to V5 corresponding to the tilt angle θ closest to the relative correction quantity data retrieved is retrieved from the lookup table in the lookup memory 19a, and then the voltage value data V1 to V5 is associated with and added to the reference correction quantity data Vc1 to Vc5, thereby determining the tilt correction quantities (V1+Vc1) to (V1+Vc5).

The voltage value of the respective drive signals Sc1 to Sc5 is set according to the tilt correction quantities (V1+Vc1) to (V1+Vc5) to allow the liquid crystal drive unit 18 to drive the liquid crystal device LCD, thereby producing a time delay distribution capable of making an appropriate tilt correction.

Now, referring to FIG. 11, the operation of tilt correction for information recording will be described in detail.

First, in step S400, the information read/write apparatus starts recording information.

In step S402 during which information is continuously being recorded, the control unit 22 detects an actual radial position of movement of the pickup PU The control unit 22 examines one by one the quantity of drive of the carriage motor provided to move the pickup PU, thereby detecting the position of the pickup PU moved by the distance ΔR from the reference position Rbase.

Furthermore, in step S404, the control unit 22 acquires the relative correction quantity data corresponding to the position of movement of the pickup PU from the aforementioned correction quantity data table, and further retrieves the lookup table shown in FIG. 9 in accordance with the relative correction quantity data to thereby acquire the voltage value data V1 to V5 corresponding to the closest tilt angle θ.

That is, since the relative correction quantity data has the dimension of angle (deg), the control unit 22 acquires, for example, the voltage value data V1(2×Δθ) to V5(2×Δθ) when the relative correction quantity data acquired from the correction quantity data table corresponding to the position of movement is the closest to the tilt angle 2×Δθ in the lookup table shown in FIG. 9.

Then, in step S406, the aforementioned voltage value data V1 to V5 acquired is associated with and added to the reference correction quantity data Vc1 to Vc5 by the liquid crystal drive unit 18 to thereby determine the tilt correction quantities (V1+Vc1) to (V1+Vc5).

That is, in terms of the aforementioned example, the terms {V1(2×Δθ)+Vc1} to {V5(2×Δθ)+Vc5} are determined as the tilt correction quantities.

Then, in step S408, the voltage of the respective drive signals Sc1 to Sc5 is set in accordance with the tilt correction quantities (V1+Vc1) to (V1+Vc5) and then supplied to the liquid crystal device LCD.

As a result, in step S410, the time delay distribution of the liquid crystal device LCD is adjusted to make tilt corrections furthermore, the drive signals Sc1 to Sc5 set in accordance with the aforementioned tilt correction quantities (V1+Vc1) to (V1+Vc5) are continually supplied until the subsequent tilt correction is made, thereby allowing the time delay distribution occurring in the liquid crystal device LCD to remain unchanged until the next tilt correction is made.

Then, in step S412, the process determines whether the information read/write apparatus has completely recorded information. The tilt servo control is ended if yes, but if not, the process returns to step S402 to repeat the processing.

The processing in step S402 to S412 repeated as described above allows the voltage value of the drive signals Sc1 to Sc5 to be variably controlled in accordance with the data in the correction quantity data table and the lookup table each time the pickup PU is moved in the radial direction of the disc DSC by the predetermined distance ΔR with respect to the reference position Rbase. Accordingly, this makes it possible to make tilt corrections with high accuracy.

In particular, suppose that the shaft having a slider mechanism slidably supporting the pickup PU is inclined in an adjustment process or the like. Even in this case, since the voltage of the drive signals Sc1 to Sc5 is set in accordance with the tilt correction quantities (V1+Vc1) to (V1+Vc5) from which the inclination effect of the shaft has been removed, it is possible to make a tilt correction appropriately.

The tilt servo system according to this embodiment is designed to provide tilt servo control by controlling the voltage of the drive signals Sc1 to Sc5 supplied to the liquid crystal device LCD, but, like the modified example of the first embodiment, may also provide tilt servo control by controlling the orientation of the objective lens L2.

That is, as a modified example of the second embodiment, the liquid crystal device LCD and the liquid crystal drive unit 18 illustrated in FIG. 8 are eliminated, an tilt actuator for variably adjusting the orientation of the objective lens L2 is provided on the pickup PU, and an actuator drive unit for controllably driving the tilt actuator is also provided.

Furthermore, in an experiment process or the like before the shipment of the product, the standard disc is loaded and successively inclined at predetermined fine angular intervals of ±Δθ so as to produce various tilt angles θ. The value of a drive voltage (or drive current) supplied to the aforementioned tilt actuator is empirically measured in order to adjust the orientation of the objective lens L2 at an angle capable of canceling out the respective tilt angles ±Δθ, ±2×θΔ, ±3×Δθ, . . . , and ±n×Δθ. The data such as the actuator drive voltage measured and the tilt angles θ are pre-stored in the lookup memory 19a as a lookup table similar to the one shown in FIG. 9.

Upon the aforementioned pre-processing shown in FIG. 10, while focus servo control is being provided with respect to a predetermined position in the lead-in area of the information write disc DSC, the tilt actuator is controllably driven in accordance with the data such as the actuator drive voltage pre-stored in the lookup table to thereby make an optimum tilt correction Then, stored in the measurement value memory 19b is the drive data Dfd obtained at the maximum RF signal SRF as the reference separation value data Dbase corresponding to the reference position data Rbase and the measurement value supplied to the tilt actuator at the maximum RF signal SRF as the reference correction quantity data Vc.

Furthermore, the drive data Dfd that is obtained when focus is achieved by moving the pickup PU by the predetermined distance ΔR from the reference position in the radial direction of the information write disc DSC is stored in the measurement value memory 19b as the separation value data D(i).

Still furthermore, the computational processing similar to that described with reference to FIG. 12 is performed in accordance with the reference position data Rbase, the reference separation value data Dbase, and the separation value data D(i) at each position of movement, which is stored in the measurement value memory 19b, thereby determining the relative correction quantity data (0, Δθ21, Δθ31, Δθ41, and so forth), from which the effect of a shaft inclination or the like is removed, to prepare a correction quantity data table.

Then, when information starts being recorded, the same processing as shown in FIG. 11 is performed, such that each time the pickup PU changes its position of movement by the predetermined distance ΔR with respect to the reference position Rbase, the relative correction quantity data corresponding to that position of movement is retrieved from the correction quantity data table and the data such as the actuator drive voltage corresponding to the tilt angle closest to the relative correction quantity data is retrieved and acquired from the lookup table in the lookup memory 19a.

The data acquired such as the actuator drive voltage is added to the reference correction quantity data Vc to find the tilt correction quantity, and the drive voltage or the like equivalent to the tilt correction quantity is supplied to the tilt actuator to thereby make an appropriate tilt correction.

As described above, it is also possible to realize a highly accurate tilt correction by adjusting the drive voltage or the drive current supplied to the tilt actuator for variably adjusting the orientation of the objective lens L2 instead of adjusting the time delay distribution of the liquid crystal device LCD for a tilt correction.

The aforementioned second embodiment and the modified example thereof are adapted to move the pickup PU radially all over the disc DSC with respect to the reference position Rbase in the stage of the pre-processing and thereafter prepare the correction quantity data table, however, the relative correction quantity may also be determined each time the pickup PU is moved by the aforementioned distance ΔR to successively prepare the correction quantity data table.

According to such a method for preparing the correction quantity data table, computational processing can be performed to determine the individual relative correction quantities during the period of time in which the pickup PU is moved by the distance ΔR. For this reason, it is possible to completely prepare the correction quantity data table before the pickup PU finishes moving radially all over the disc DSC. Thus, it is possible to provide such effects of shortening the time required for the pre-processing and transferring quickly to the processing for actual information recording.

Furthermore, the second embodiment and the modified example thereof are adapted to update the tilt correction each time the pickup PU moves by the predetermined distance ΔR from the reference position Rbase, but the distance ΔR has not always to be equidistant.

It is only essential that upon the pre-processing, the process detects a position to which the pickup PU has moved and then determines the separation value data D(i) corresponding to the position detected to prepare the aforementioned correction quantity data table, while the tilt correction is made in accordance with each data in the correction quantity data table and the lookup table in response to any of the positions, detected upon the aforementioned pre-processing, to which the pickup PU moves upon information recording.

On the other hand, the processing in step S404 to S408 shown in FIG. 11 may be subsequently performed after step S324 shown in FIG. 10 to determine the tilt correction quantities (V1+Vc1) to (V1+Vc5) corresponding to the position of movement at each distance ΔR before information starts to be recorded.

Determining the tilt correction quantities (V1+Vc1) to (V1+Vc5) in advance as described above makes it possible to instantly determine the tilt correction quantities (V1+Vc1) to (V1+Vc5) corresponding to the position of movement of the pickup PU at each distance ΔR after information starts to be recorded, thus making it possible to reduce the processing burden of the control unit 22 or the like upon recording information.

According to the tilt servo system of the present invention, the reference tilt error and the reference correction quantity are determined when the pickup is located opposite to a predetermined position of an information storage medium, and when the pickup is located opposite to other than the predetermined position of the information storage medium, the difference between the tilt error obtained then and the reference tilt error is employed as a relative correction quantity to make a tilt correction in accordance with a tilt correction quantity obtained by adjusting the reference correction quantity based on the aforementioned relative correction quantity, thus making it possible to realize stable and highly accurate tilt servo control. Furthermore, during actual operation, since the reference tilt error, the reference correction quantity, the relative correction quantity, and the tilt correction quantity are automatically determined, an appropriate tilt correction is made even when the service environment or the like of the tilt servo system according to the present invention varies. As a result, it is possible to provide a maintenance-free tilt servo system. While there has been described what are at present considered to be preferred embodiments of the present invention, it will be understood that various modifications may be made thereto, and it is intended that the appended claims cover all such modifications as fall within the true spirit and scope of the invention.

What is claimed is:

1. A tilt servo system for correcting a tilt angle between an objective lens provided in an optical pickup and an information storage medium, said system comprising:

a phase correction device for adjusting a phase of a light beam emitted from a light source and incident on the information storage medium through the objective lens;

a moving device for moving the pickup in the radial direction of the information storage medium; and a control device for calculating a reference position of the pickup on the information storage medium as well as a reference tilt angle in a region through which the pickup has moved from the reference position, in accordance with a separation value which comprises a distance between the information storage medium and the objective lens in focusing, and based on a distance through which the pickup has moved, wherein the control device further detects a relative tilt angle of the information storage medium which is a difference between the reference tilt angle and an actual tilt angle in an optical region through which the pickup has moved from the reference position, and drives the phase correction device in accordance with tilt correction quantities corresponding to relative tilt angles, wherein the servo system further comprises:

a first storage device for storing reference correction data which comprises drive data corresponding to said reference tilt angle; and a second storage device storing drive data corresponding to a plurality of pre-estimated respective tilt angles, wherein the control device searches the second storage device for drive data being associated with an angle closest to a relative tilt angle, and drives said phase correction device in accordance with the sum of the drive data and the reference correction data.

2. The tilt servo system according to claim 1, wherein said drive data represents a reference correction amount in which an amplitude of a radio frequency (RF) signal at the time of reading information recorded in said information storage medium is higher than any other drive data stored in the second storage device.

3. The tilt servo system according to claim 2, wherein said optical region comprises a region corresponding to a lead-in area of said information storage medium.

4. The tilt servo system according to claim 1, wherein said optical region comprises a region corresponding to a lead-in area of said information storage medium.

* * * * *